(12) United States Patent
Kim et al.

(10) Patent No.: US 10,284,287 B2
(45) Date of Patent: May 7, 2019

(54) METHOD FOR TRANSMITTING AND RECEIVING CONFIRMATION RESPONSE SIGNAL FOR UPLINK MULTI-USER DATA IN WIRELESS LAN SYSTEM, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG Electronics Inc., Seoul (KR)

(*) Notice: Subject to any disclaimer, the term of this patent is extended or adjusted under 35 U.S.C. 154(b) by 3 days.

(21) Appl. No.: 15/567,009

(22) PCT Filed: Apr. 29, 2016

(86) PCT No.: PCT/KR2016/004550
§ 371 (c)(1),
(2) Date: Oct. 16, 2017

(87) PCT Pub. No.: WO2016/175614
PCT Pub. Date: Nov. 3, 2016

(65) Prior Publication Data
US 2019/0052353 A1 Feb. 14, 2019

Related U.S. Application Data

(60) Provisional application No. 62/154,134, filed on Apr. 29, 2015, provisional application No. 62/159,962, (Continued)

(51) Int. Cl.
*H04W 74/08* (2009.01)
*H04B 7/26* (2006.01)
(Continued)

(52) U.S. Cl.
CPC ......... *H04B 7/2612* (2013.01); *H04B 7/0452* (2013.01); *H04L 1/1812* (2013.01); *H04L 5/0007* (2013.01); *H04W 56/0005* (2013.01)

(58) Field of Classification Search
CPC ... H04B 7/2612; H04B 7/0452; H04L 1/1812; H04L 5/0007; H04W 56/0005
See application file for complete search history.

(56) References Cited

U.S. PATENT DOCUMENTS

2013/0301569 A1 11/2013 Wang et al.
2016/0330714 A1* 11/2016 Hedayat ............ H04W 72/1289
(Continued)

FOREIGN PATENT DOCUMENTS

KR 10-2011-0095098 A 8/2011
WO 2011/102575 A1 8/2011
WO 2013/157787 A1 10/2013

OTHER PUBLICATIONS

Kwon, et al.: "Issues on UL-OFDMA Transmission", IEEE 802. 11-14/1431r0, Nov. 3, 2014.

*Primary Examiner* — Dac V Ha
(74) *Attorney, Agent, or Firm* — Dentons US LLP

(57) ABSTRACT

A method by which a station (STA) receives a Multi-STA BlockAck (M-BA) frame in a wireless LAN system supporting an OFDMA, according to one embodiment of the present invention, comprises the steps of: transmitting an uplink multi-user (ULMU) frame on the basis of a trigger frame; receiving an M-BA frame based on an OFDMA physical layer protocol data unit (PPDU) including an SIG B field; and acquiring a data stream including an ACK/ NACK for the STA from the OFDMA PPDU-based M-BA frame, wherein the STA acquires the data stream according to an indication of a user field identified by a predetermined ID among a plurality of user fields included in the SIG B field, and the data stream indicated by the user field iden-
(Continued)

tified by the predetermined ID can be equally allocated to other STAs performing the UL MU transmission on the basis of the trigger frame.

14 Claims, 45 Drawing Sheets

Related U.S. Application Data filed on May 12, 2015, provisional application No. 62/170,700, filed on Jun. 4, 2015, provisional application No. 62/276,245, filed on Jan. 8, 2016, provisional application No. 62/281,121, filed on Jan. 20, 2016, provisional application No. 62/296,618, filed on Feb. 18, 2016, provisional application No. 62/297,948, filed on Feb. 22, 2016, provisional application No. 62/298,947, filed on Feb. 23, 2016, provisional application No. 62/305,473, filed on Mar. 8, 2016, provisional application No. 62/314,998, filed on Mar. 30, 2016.

(51) Int. Cl.
    *H04B 7/0452*     (2017.01)
    *H04L 1/18*     (2006.01)
    *H04W 56/00*     (2009.01)
    *H04L 5/00*     (2006.01)

(56) References Cited

U.S. PATENT DOCUMENTS

2017/0280424 A1\*   9/2017   Ghosh ................ H04W 72/042
2018/0077735 A1\*   3/2018   Ahn ...................... H04W 28/26
2018/0146426 A1\*   5/2018   Park ................... H04W 74/002

\* cited by examiner

Octets:            2                              128

Bits:            4                12

FIG. 31

| RU allocation = 11000111 | User field #1 | User field #2 | User field #3 | User field #4 | User field #5 | User field #6 | User field #7 | User field #8 | User field #9 |
|---|---|---|---|---|---|---|---|---|---|

Number of stream =2

SC=0010  SC=0010  SC=0010  SC=0010  SC=0010  SC=0010  SC=0010  SC=0010  SC=1110

*SC = spatial configuration index

METHOD FOR TRANSMITTING AND RECEIVING CONFIRMATION RESPONSE SIGNAL FOR UPLINK MULTI-USER DATA IN WIRELESS LAN SYSTEM, AND APPARATUS THEREFOR

This application is a National Stage Application of International Application No. PCT/KR2016/004550, filed on Apr. 29, 2016, which claims the benefit of U.S. Provisional Application No. 62/154,134, filed on Apr. 29, 2015, U.S. Provisional Application No. 62/159,962, filed on May 12, 2015, U.S. Provisional Application No. 62/170,700, filed on Jun. 4, 2015, U.S. Provisional Application No. 62/276,245, filed on Jan. 8, 2016, U.S. Provisional Application No. 62/281,121, filed on Jan. 20, 2016, U.S. Provisional Application No. 62/296,618, filed on Feb. 18, 2016, U.S. Provisional Application No. 62/297,948, filed on Feb. 22, 2016, U.S. Provisional Application No. 62/298,947, filed on Feb. 23, 2016, U.S. Provisional Application No. 62/305,473, filed on Mar. 8, 2016 and U.S. Provisional Application No. 62/314,998, filed on Mar. 30, 2016, all of which are hereby incorporated by reference in their entirety for all purposes as if fully set forth herein.

TECHNICAL FIELD

The following description relates to a method for transmitting and receiving an acknowledgement signal for multi-user or multi-station (STA) data in a wireless LAN system, and an apparatus therefor.

BACKGROUND ART

Standards for a WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams, and IEEE 802.11ax standards are under discussion.

DISCLOSURE

Technical Problem

An object of the present invention devised to solve the problem lies in a method for efficiently setting signaling for transmitting an M-BA frame on the basis of an 11ax PPDU and an apparatus for performing the same.

The objects that could be achieved with the present invention are not limited to what has been particularly described hereinabove and can be inferred from embodiments of the present invention.

Technical Solution

In an aspect of the present invention, a method of receiving a multi-STA BlockAck (M-BA) frame by a station (STA) in a wireless LAN system supporting OFDMA includes: transmitting an uplink multi-user (UL MU) frame based on a trigger frame; receiving an OFDMA physical layer protocol data unit (PPDU) based M-BA frame, the OFDMA PPDU including a SIG B field; and acquiring a data stream including ACK/NACK for the STA from the OFDMA PPDU based M-BA frame, wherein the STA acquires the data stream according to indication of a user field identified by a predetermined ID from among a plurality of user fields included in the SIG B field, and wherein the data stream indicated by the user field identified by the predetermined ID is identically allocated to other STAs which have performed UL MU transmission based on the trigger frame.

In another aspect of the present invention, a station (STA) receiving a multi-STA BlockAck (M-BA) frame in a wireless LAN system supporting OFDMA includes: a transmitter for transmitting an uplink multi-user (UL MU) frame based on a trigger frame; a receiver for receiving an M-BA frame based on an OFDMA physical layer protocol data unit (PPDU) including a SIG B field; and a processor for acquiring a data stream including ACK/NACK for the STA from the OFDMA PPDU based M-BA frame, wherein the processor acquires the data stream according to indication of a user field identified by a predetermined ID from among a plurality of user fields included in the SIG B field, and wherein the data stream indicated by the user field identified by the predetermined ID is identically allocated to other STAs which have performed UL MU transmission based on the trigger frame.

Preferably, the STA may be multiplexed with the said other STAs which have performed UL MU transmission based on the trigger frame on at least one of resource units (RUs) allocated through a user common field of the SIG B field.

More preferably, whether the least one RU on which the STA and the said other STAs are multiplexed corresponds to MU-MIMO allocation or single user (SU) allocation may be indicated by an RU allocation index configured in the user common field.

Preferably, the predetermined ID may be a group ID (GID) allocated through the trigger frame or an association ID (AID) of the STA.

More preferably, the GID may be allocated according to a combination of a reference GID and a GID index included in the trigger frame, and the GID index may indicate a difference between a value of the reference GID and a GID value allocated to the STA.

More preferably, the trigger frame may indicate whether the GID is allocated to the STA through a trigger type subfield or a GID presence subfield.

Preferably, each of the plurality of user fields may include a spatial configuration index indicating whether a corresponding user field corresponds to MU-MIMO allocation or SU allocation.

More preferably, when the corresponding user field corresponds to SU allocation, the number of data streams of the corresponding user field indicated by the spatial configuration index may be set to be identical to a total number of data streams for all of the user fields.

More preferably, when the spatial configuration index corresponds to a specific value in an N-th user field, a data stream of an (N+1)-th user field may be set to be identical to a data stream of the N-th user field.

In another aspect of the present invention, a method of transmitting an M-BA frame by an access point (AP) to stations (STAs) in a wireless LAN system supporting OFDMA includes: transmitting a trigger frame to a plurality of STAs including a first STA and a second STA; receiving a plurality of UL MU frames from the plurality of STAs based on the trigger frame; and transmitting an M-BA frame based on an OFDMA PPDU including a SIG B field in response to the UL MU frames, wherein the AP indicates a first user field to be received by the first STA from among a plurality of user fields included in the SIG B field using a predetermined ID, wherein a data stream of the first STA allocated through the first user field is identically allocated to the second STA which has performed UL MU transmission based on the trigger frame.

Advantageous Effects

According to an embodiment of the present invention, overhead of signaling for transmitting an M-BA frame on the basis of an 11ax PPDU is minimized, and thus the M-BA frame can be efficiently transmitted and received.

The effects that can be achieved with the present invention are not limited to what has been particularly described hereinabove and can be inferred from embodiments of the present invention.

DESCRIPTION OF DRAWINGS

FIG. 31 illustrates an HE-SIG B field according to an embodiment of the present invention.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method for efficiently utilizing a channel having a wide bandwidth in a Wireless Local Area Network (WLAN) system and an apparatus therefor. To this end, a WLAN system to which the present invention is applicable will be described first in detail.

Figure 1:
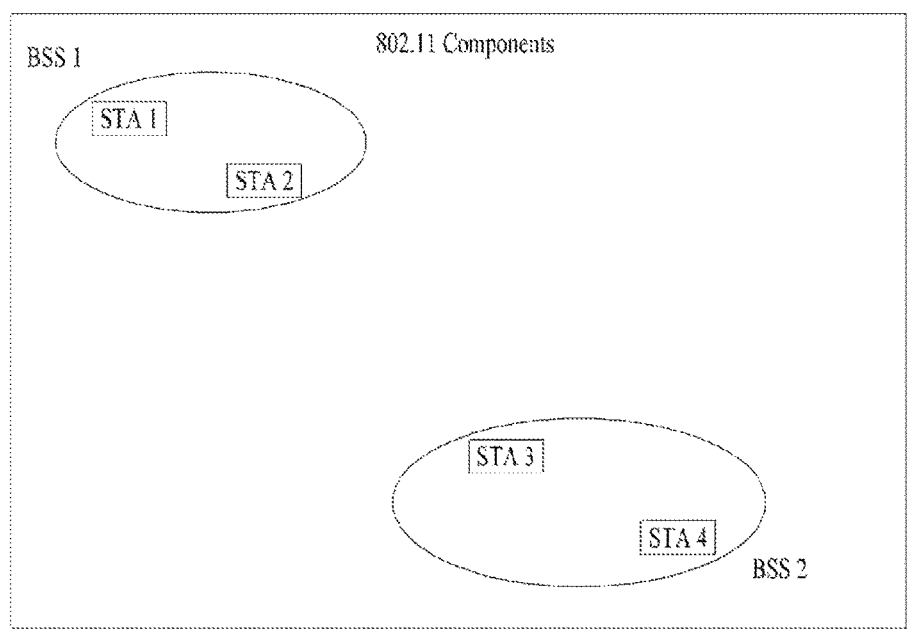
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of Stations (STAs) that are able to communicate with each other by successfully performing synchronization.

An STA is a logical entity including a physical layer interface between a Media Access Control (MAC) layer and a wireless medium. The STA may include an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
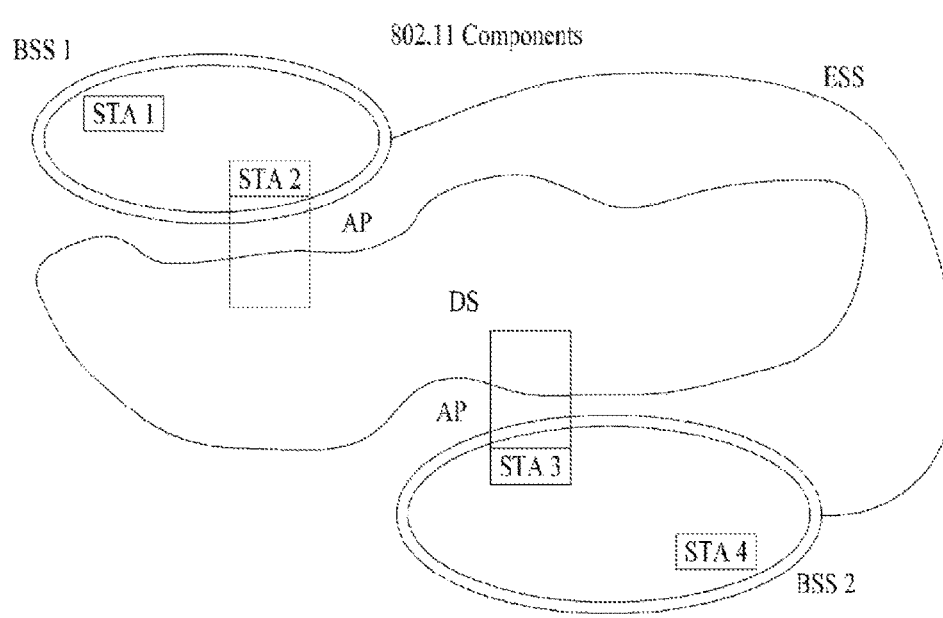
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Block Acknowledgment

Based on the above description, a Block Acknowledgment (ACK) scheme in a WLAN system will be described hereinbelow.

The Block ACK mechanism is a scheme of improving channel efficiency by aggregating and then transmitting a plurality of ACKs in one frame. There are two types of Block ACK mechanism schemes: an immediate ACK scheme and a delayed ACK scheme. The immediate ACK scheme may be suitable for high-bandwidth, low-latency traffic transmission, whereas the delayed ACK scheme is favorable for applications that can tolerate latency. Unless particularly specified otherwise in the below description, an STA that transmits data using the Block ACK mechanism is referred to as an originator and an STA that receives the data using the Block ACK mechanism is referred to as a recipient.

Figure 3:
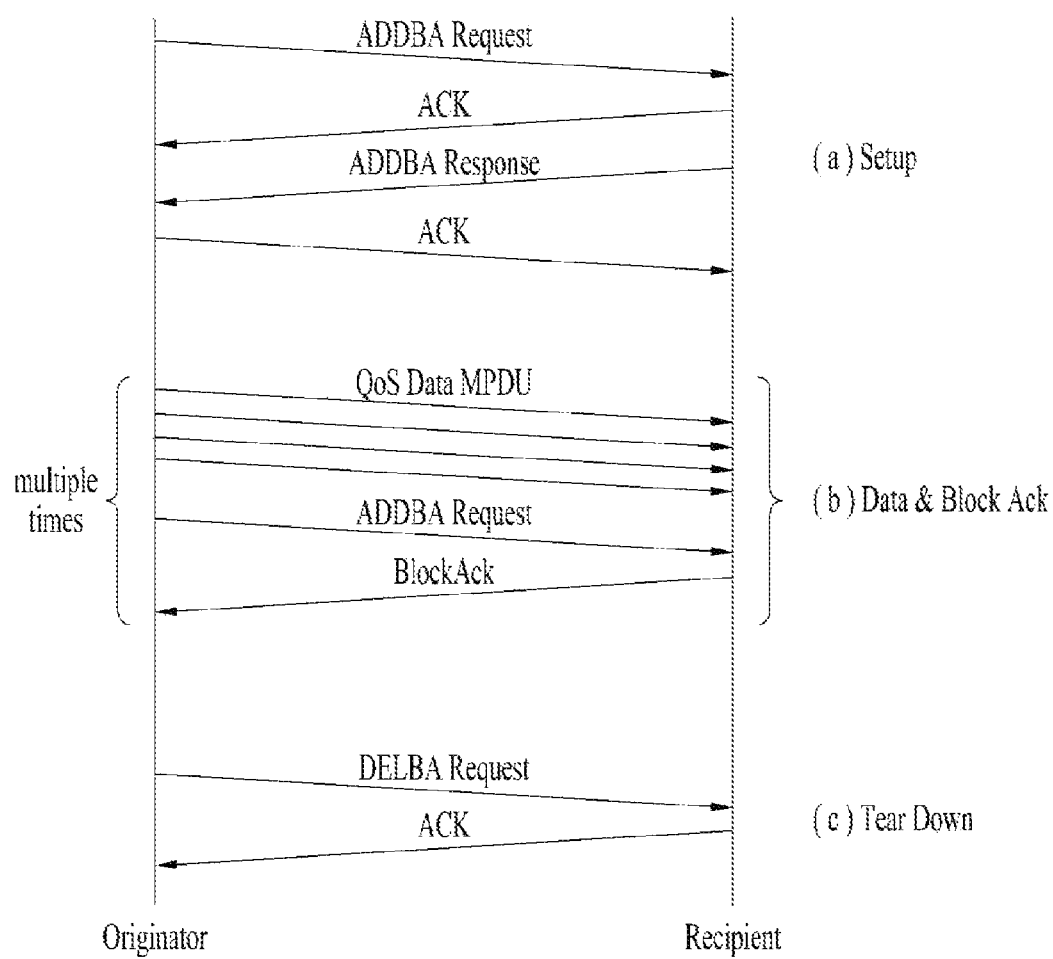
FIG. 3 is diagram for describing a block Ack mechanism used in a wireless LAN system.

FIG. 3 is a diagram illustrating a Block ACK mechanism used in a WLAN system.

The Block ACK mechanism may be initialized by an exchange of Add Block Acknowledgment (ADDBA) request/response frames as illustrated in FIG. 3 ((a) Setup step). After the Block ACK mechanism is initialized, a block of Quality of Service (QoS) data frames may be transmitted by an originator to a recipient. Such a block may be started within a polled Transmission Opportunity (TXOP) or by winning Enhanced Distributed Channel Access (EDCA) contention. The number of frames in the block may be limited. MAC Packet Data Units (MPDUs) in the block of frames may be acknowledged by a BlockAck frame, which is requested by a BlockAckReq frame ((b) Data & Block ACK step).

When the originator has no data to transmit and a final Block ACK exchange is completed, the originator may end the Block ACK mechanism by transmitting a Delete Block Acknowledgment (DELBA) frame to the recipient. Upon receiving the DELBA frame, the recipient may release all resources allocated for Block ACK transfer ((c) Tear Down step).

Figure 4:
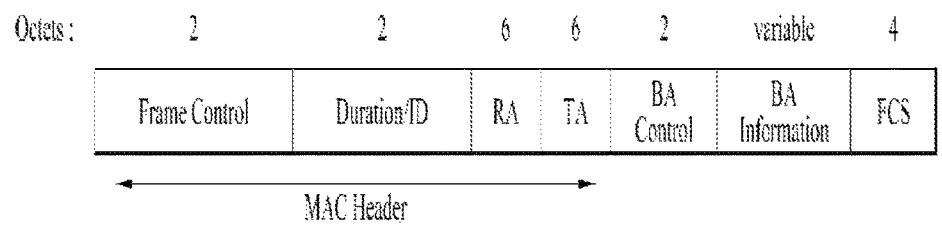
FIG. 4 illustrates a basic configuration of a block acknowledgement frame.

FIG. 4 is a diagram illustrating a basic configuration of a Block ACK frame.

The Block ACK frame may include a MAC Header field, a Block ACK (BA) Control field, and a BA Information field. The MAC Header field may include a Frame Control field, a Duration/ID field, an RA field, and a TA field. Herein, the RA field represents an address of a receiver STA and the TA field represents an address of a transmitter STA.

Figure 5:
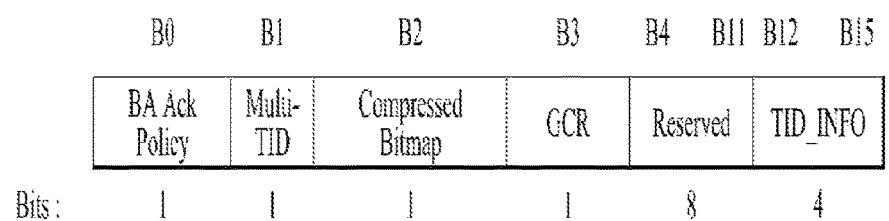
FIG. 5 illustrates a specific configuration of a BA control field shown in FIG. 4.

FIG. 5 is a diagram illustrating a detailed configuration of the BA Control field illustrated in FIG. 4.

A value of a BA ACK Policy subfield in the BA Control field may have the meaning shown in Table 1a below.

TABLE 1a

| Value | Meaning |
|---|---|
| 0 | Normal Acknowledgment, The BA Ack Policy subfield is set to this value when the sender requires immediate acknowledgement. The addressee returns an Ack frame. The value 0 is not used for data sent under HT-delayed, Block Ack during a PSMP sequence. The value 0 is not used in frames transmitted by DMG STAs. |
| 1 | No Acknowledgment. The addresee sends no immediate response upon receipt of the frame. The BA Ack Policy is set to this value when the sender does not require immediate acknowledgment. The value 1 is not used in a Basic BlockAck frame outside a PSMP sequence. The value 1 is not used in an Multi-TID BlockAck frame. |

Meanwhile, Multi-Traffic Identifier (Multi-TID), Compressed Bitmap, and GCR subfields in the BA Control field may determine possible BlockAck frame variants according to the following regulation.

TABLE 1b

| Multi-TID subfield value | Compressed Bitmap subfield value | GCR subfield value | BlockAct frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

Figure 6:
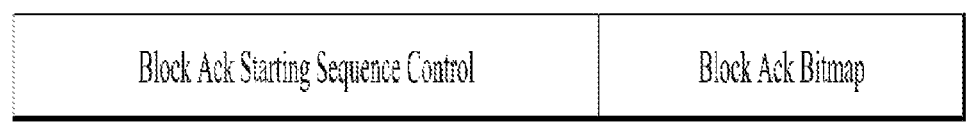
FIG. 6 illustrates a specific configuration of a BA information field shown in FIG. 4.
Figure 7:
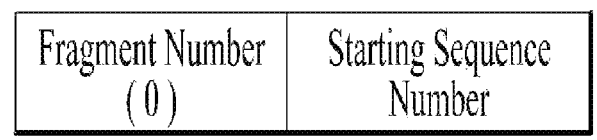
FIG. 7 illustrates a configuration of a block Ack starting sequence control subfield.

FIG. 6 is a diagram illustrating a detailed configuration of the BA Information field illustrated in FIG. 4, and FIG. 7 is a diagram illustrating a configuration of a Block Ack Starting Sequence Control subfield.

As illustrated in FIG. 6, the BA Information field may include a Block Ack Starting Sequence Control (SSC) subfield and a Block Ack Bitmap subfield.

As illustrated in FIG. 6, the Block Ack Bitmap subfield is 128 octets in length and thus may represent a reception status of 64 MAC Service Data Units (MSDUs). If a bit position n of the Block Ack Bitmap subfield is set to 1, this may indicate that an MPDU having an MPDU sequence control value corresponding to (SSC+n) has been successfully received, wherein SSC denotes a value of the Block Ack Starting Sequence Control subfield. In contrast, if the bit position n of the Block ACK Bitmap field is set to 0, this may indicate that the MPDU having the MPDU sequence control value corresponding to (SSC+n) has not been received. Each of values of an MPDU Sequence Control field and the Block Ack Starting Sequence Control subfield may be treated as a 16-bit unsigned integer. For unused fragment numbers of an MSDU, corresponding bits in a bitmap may be set to 0.

Figure 8:
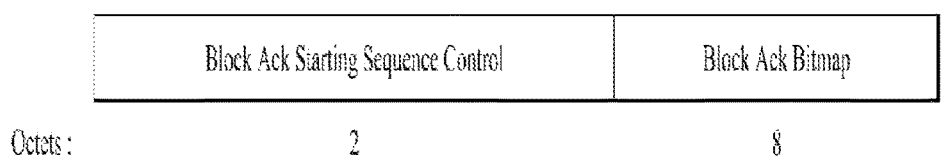
FIG. 8 illustrates a BA information field configuration of a compressed block Ack frame.

FIG. 8 is a diagram illustrating a configuration of a BA Information field of a compressed Block ACK frame As illustrated in FIG. 8, a Block Ack Bitmap subfield of the BA Information field of the compressed Block ACK frame may be 8 octets in length and indicate a reception status of 64 MAC Service data Units (MSDUs) and Aggregate MSDUs (A-MSDUs). The first bit of a bitmap corresponds to an MSDU or an A-MSDU matching a value of a Block Ack Starting Sequence Control subfield and respective bits may sequentially correspond to MSDUs or A-MSDUs after the above MSDU or the A-MSDU.

Figure 9:
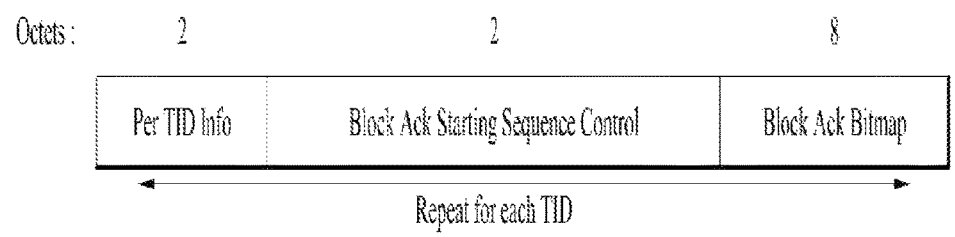
FIG. 9 illustrates a BA information field of a multi-TID block Ack frame.

FIG. 9 is a diagram illustrating a BA Information field of a Multi-TID Block ACK frame.

A TID_INFO subfield of the BA Information field of the Multi-TID Block ACK frame contains information about the number of TIDs in the BA Information field. Specifically, a value of the TID_INFO subfield represents (the number of TIDs corresponding to information of the BA Information field)-1. For example, if the value of the TID_INFO subfield is 2, this may indicate that the BA Information field contains information about three TIDs.

Meanwhile, the Multi-TID Block ACK frame may include a Per TID Info subfield in addition to a Block Ack Starting Sequence Control subfield and a Block Ack Bitmap subfield as illustrated in FIG. 9. The first emerging Per TID Info, Block Ack Starting Sequence Control, and Block Ack Bitmap subfields may be transmitted in correspondence to the lowest TID value and subsequently repeated subfields may correspond to the next TID. A triplet of these subfields may be repeated per TID.

Figure 10:
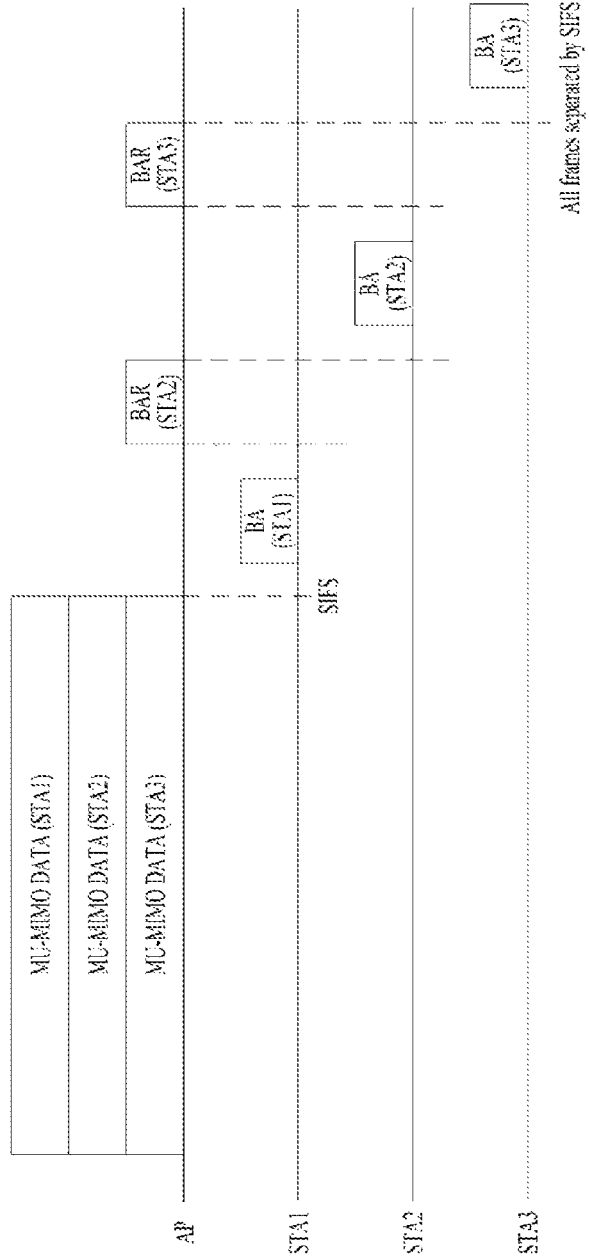
FIGS. 10 and 11 are diagrams for describing a case in which a block Ack mechanism is applied to downlink MU-MIMO.
Figure 11:
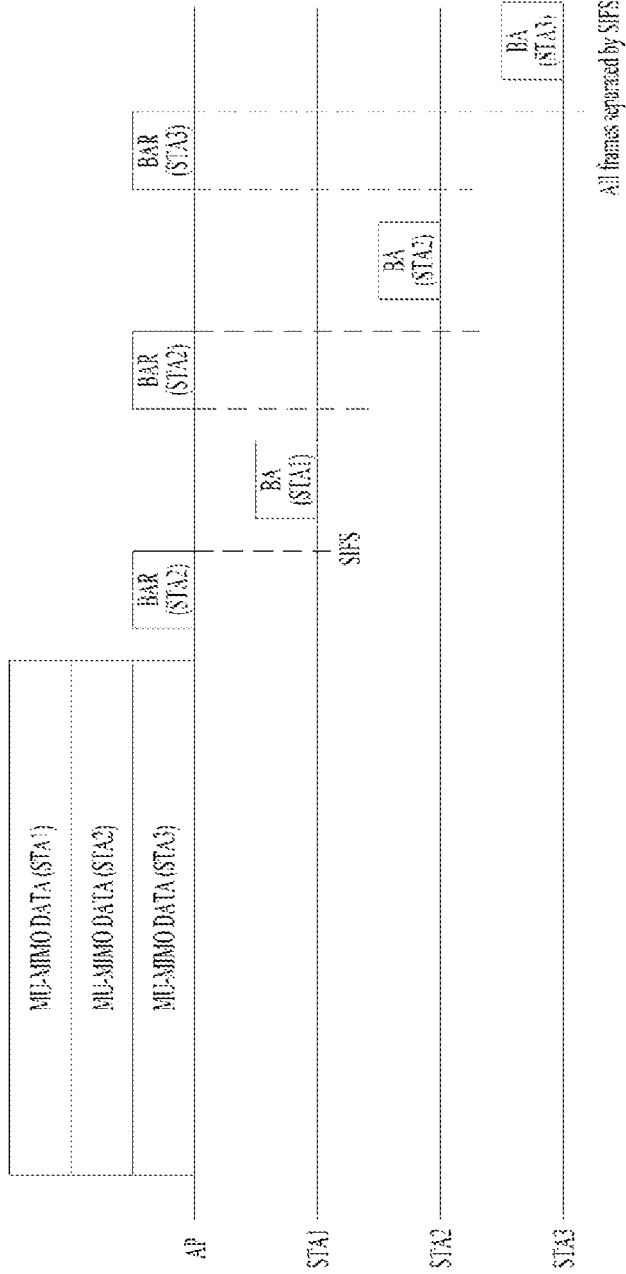

FIGS. 10 and 11 are diagrams illustrating a case in which a Block ACK mechanism is applied to a Downlink (DL) Multi-User Multiple Input Multiple Output (MU-MIMO) scheme.

As illustrated in FIGS. 10 and 11, an AP may transmit MU-MIMO data frames to a plurality of STAs, STA 1 to STA 3.

It is assumed in FIG. 10 that frame exchange is performed after a Short InterFrame Space (SIFS) after an MU PLCP Packet Data Unit (PPDU) is transmitted. It is also assumed in FIG. 10 that for STA1, an implicit Block Ack request is configured as Ack policy and, for STA 2 and STA 3, a Block ACK is configured as Ack policy. Then, STA 1 may immediately transmit a BA frame after receiving a DL MU PPDU even without receiving a request for the Block ACK. In contrast, the AP may perform polling by transmitting a BA Request (BAR) frame to STA 2 and STA 3 and then STA 2 and STA 3 may transmit BA frames.

Meanwhile, FIG. 11 illustrates an example of performing a frame exchange without an SIFS after an MU PPDU is transmitted and it is assumed that a Block ACK is configured as ACK policy for all STAs. Therefore, the AP may perform polling by transmitting a BAR frame to all STAs.

Example of HE PPDU

A description will be given of examples of an HE PPDU (High Efficiency Physical layer Protocol Data Unit) format in a wireless LAN system supporting 11ax.

Figure 12:
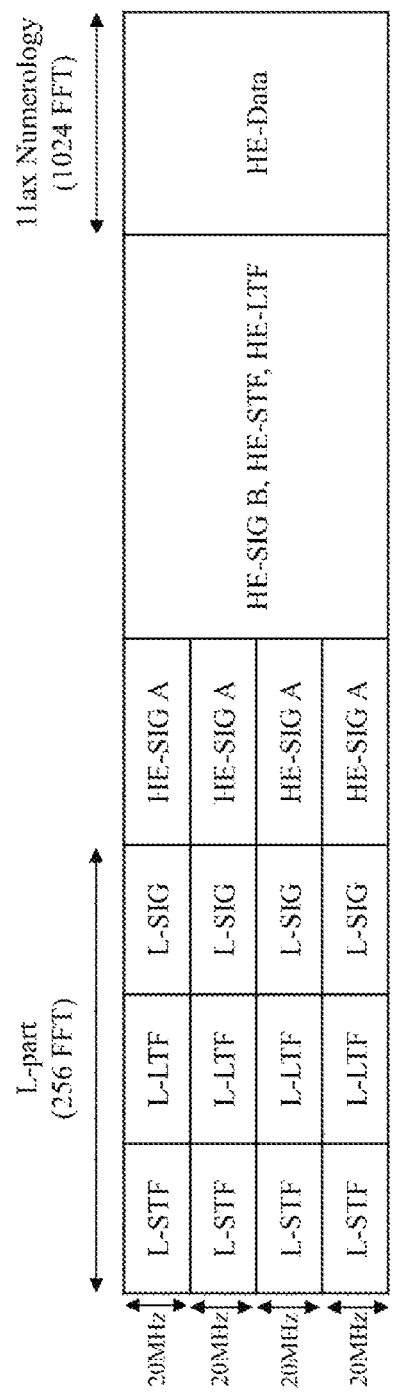
FIG. 12 illustrates an example of an HE PPDU.

FIG. 12 illustrates an example of an HE PPDU. Referring to FIG. 12, an HE-SIG A (or HE-SIG1) field follows an L-Part (e.g., L-STF, L-LTF, L-SIG) and is duplicated in units of 20 MHz like the L-Part. HE-SIG A includes common control information) (e.g., BW, GI length, BSS index, CRC, Tail, etc.) for STAs. The HE-SIG A field includes information for analyzing the HE PPDU and thus information included in the HE-SIG A field may depend on the format of the HE PPDU (e.g., SU PPDU, MU PPDU or trigger based PPDU). For example, in an HE SU PPDU format, the HE-SIG A field may include at least one of a DL/UL indicator, an HE PPDU format indicator, a BSS color, a TXOP duration, a BW (bandwidth), an MCS, CP+LTF length, coding information, the number of streams, STBC (e.g., whether STBC is used), Tx beamforming (TxBF) information, CRC, and Tail. In the case of HE SU PPDU format, an HE-SIG B field can be omitted. In the HE MU PPDU format, the HE-SIG A field may include at least one of a DL/UL indicator, a BSS color, a TXOP duration, a BW (bandwidth), MCS information of the SIG B field, the number of symbols of the SIG B field, the number of HE LTF symbols, an indicator indicating whether full-band MU-MIMO is used, CP+LTF length, Tx beamforming (TxBF) information, CRC and Tail. In an HE trigger-based PPDU format, the HE-SIG A field may include at least one of a format indicator (e.g., indicator indicating SU PPDU or trigger based PUDU), a BSS color, a TXOP duration, a BW, CRC and Tail.

Figure 13:
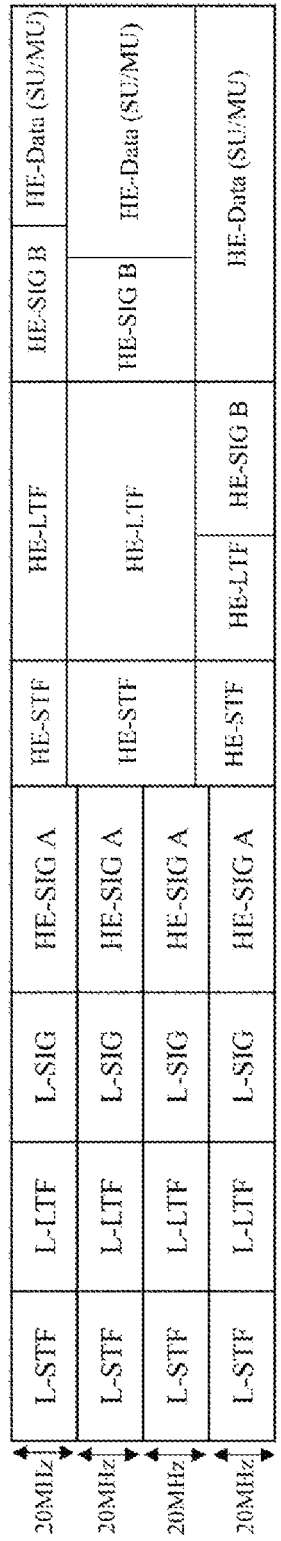
FIG. 13 illustrates another example of the HE PPDU.

FIG. 13 illustrates another example of the HE PPDU. Referring to FIG. 13, the HE-SIG A may include at least one of user allocation information, for example, an STA ID such as PAID or GID, allocated resource information, and the number of streams, Nsts, in addition to the aforementioned common control information. Referring to FIG. 13, HE-SIG B (or HE-SIG2) can be transmitted per OFDMA allocation. In the case of MU-MIMO, HE-SIG B is identified by an STA through SDM. HE-SIG B may include additional user allocation information, e.g., an MCS, coding information, STBC (Space Time Block code) information, Tx beamforming (TXBF) information, etc.

Figure 14:
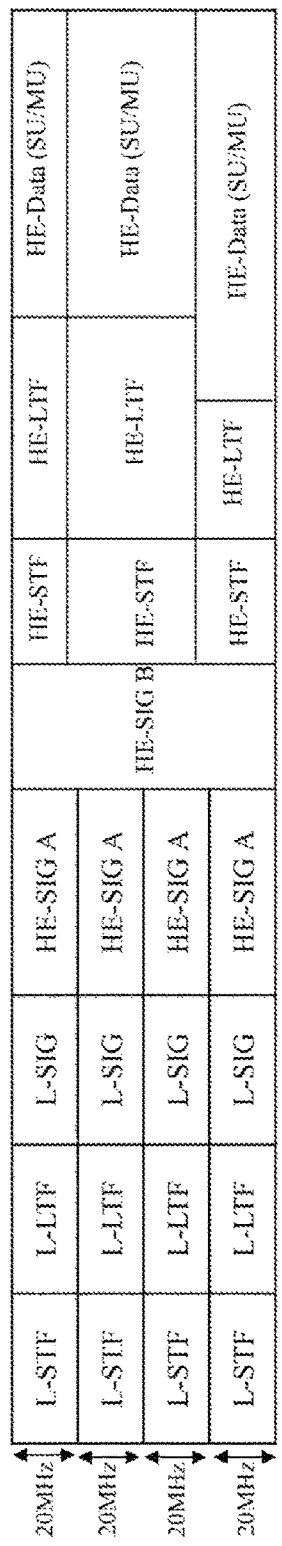
FIG. 14 illustrates another example of the HE PPDU.

FIG. 14 illustrates another example of the HE PPDU. HE-SIG B is transmitted following HE-SIG A. HE-SIG B can be transmitted through full band on the basis of information (numerology) of HE-SIG A. HE-SIG B may include user allocation information, e.g., an STA AID, resource allocation information (e.g., allocation size), an MCS, the number of streams, Nsts, coding, STBC, TXBF, etc.

Figure 15:
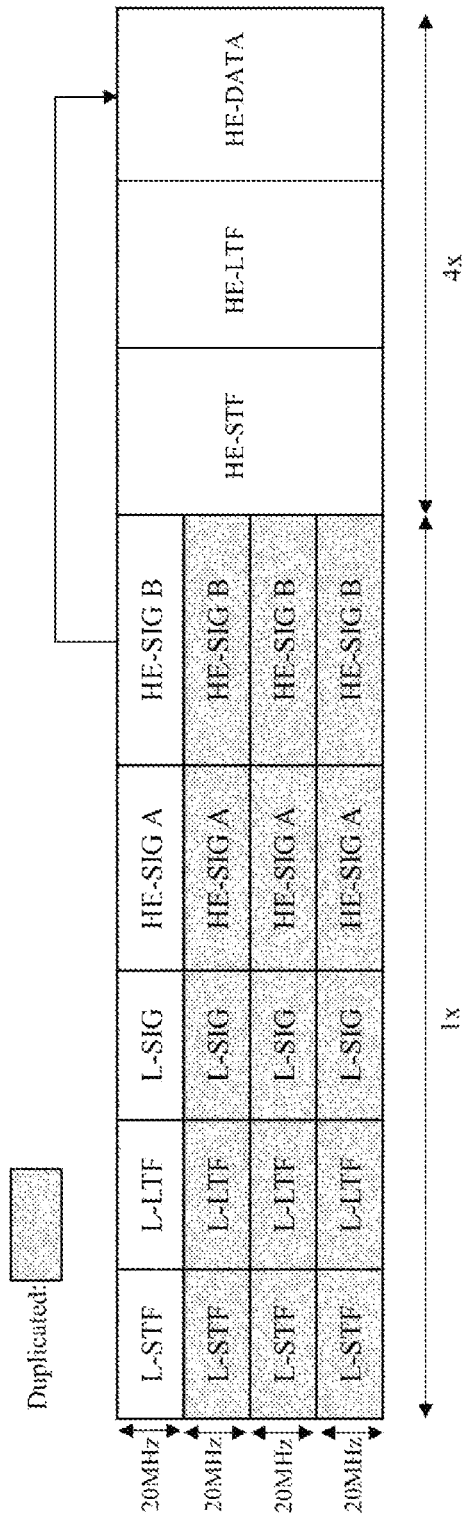
FIG. 15 illustrates another example of the HE PPDU.

FIG. 15 illustrates another example of the HE PPDU. HE-SIG B can be duplicated per unit channel Referring to FIG. 15, HE-SIG B can be duplicated in units of 20 MHz. For example, HE-SIG information can be transmitted in such a manner that the same information is duplicated per 20 MHz in the bandwidth of 80 MHz.

Upon reception of HE-SIG B duplicated per 20 MHz and transmitted, an STA/AP can accumulate HE-SIG B received per 20 MHz to improve reliability of HE-SIG B reception.

Since the same signal (e.g., HE-SIG B) is duplicated and transmitted per channel, gain of accumulated signals is proportional to the number of channels to improve reception performance A signal which is duplicated and transmitted may ideally have a gain corresponding to 3 dB×the number of channels compared to the signal before being duplicated and transmitted. Accordingly, HE-SIG B, which is duplicated and transmitted, can be transmitted with an increased MCS level depending on the number of channels over which HE-SIG B is duplicated and transmitted. For example, if MCS0 is used for HE-SIG B when duplicated transmission is not performed, MCS1 can be used for HE-SIG B duplicated and transmitted using 40 MHz. Since HE-SIG B can be transmitted through a higher MCS level as the number of channels for duplicated transmission increases, overhead of HE-SIG B per unit channel can be reduced.

Figure 16:
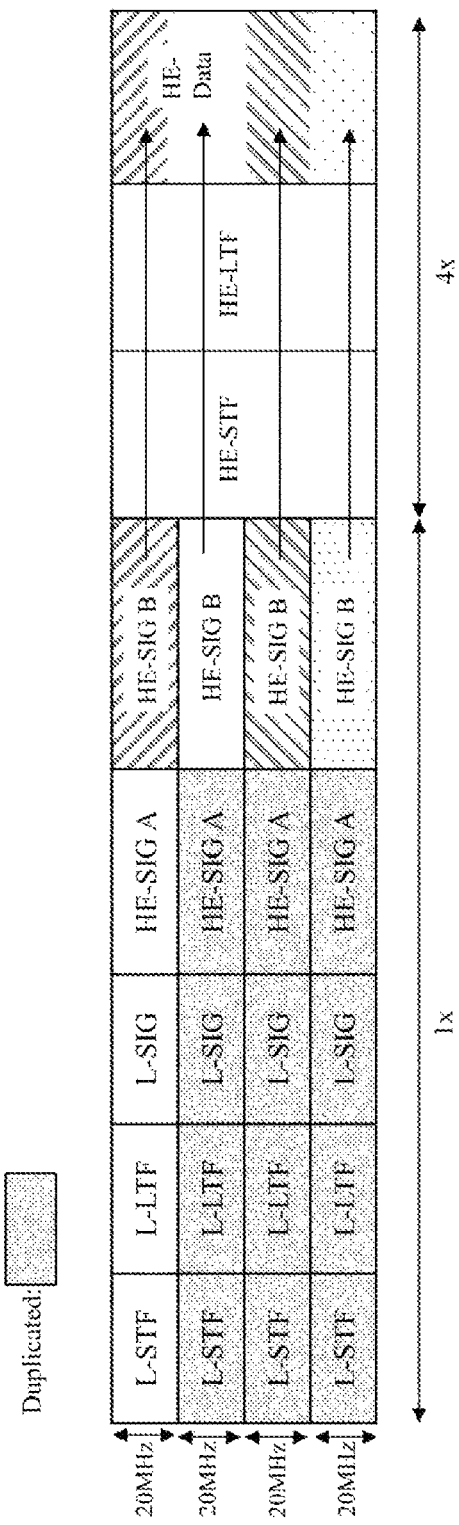
FIG. 16 illustrates another example of the HE PPDU.

FIG. 16 illustrates another example of the HE PPDU. Referring to FIG. 16, HE SIG B may include independent information per 20 MHz channel. HE-SIG B can be transmitted in a 1x symbol structure like L-Part (e.g., L-STF, L-LTF, L-SIG) and HE-SIG A. Meanwhile, in a wide bandwidth, the length of "L-STF+L-LTF+L-SIG+HE-SIGA+HE-SIGB" needs to be identical in all channels. HE-SIG B transmitted per 20 MHz may include allocation information about the corresponding band, for example, allocation information per user using the corresponding band, a user ID, and the like. However, the number of users supported per band and a resource block configuration used in each band are different for the respective bands, and thus information of HE-SIG B may be different for the respective bands. Accordingly, the length of HE-SIG B can be different for respective channels.

Figure 17:
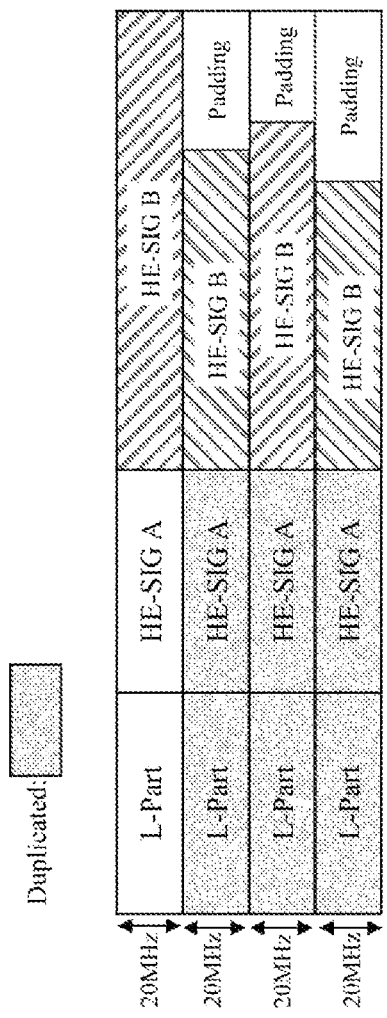
FIGS. 17 and 18 illustrate a padding method for HE-SIG B.
Figure 18:
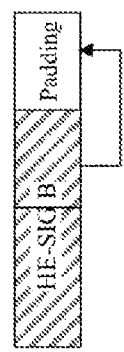
Figure 18:
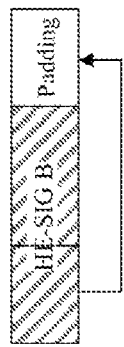

FIG. 17 illustrates a padding method with respect to HE-SIG B for obtaining the same length before HE-STF (e.g., the same length to HE-SIG B) for respective channels. For example, HE-SIG B can be duplicated by a padding length to align the length of HE-SIG B. As shown in FIG. 18, HE-SIG B corresponding to a required padding length can be padded to HE-SIG B from the beginning (or end) of HE-SIG B.

According to an embodiment, one HE-SIG B field can be transmitted in the case of a bandwidth which does not exceed 20 MHz. In the case of a bandwidth exceeding 20 MHz, first type HE-SIG B (referred to as HE-SIG B [1] hereinafter) or second type HE-SIG B (referred to as HE-SIG B [2]) can be transmitted over 20 MHz channels. For example, HE-SIG B [1] and HE-SIG B [2] may be alternately transmitted. HE-SIG B [1] may be transmitted over an odd-numbered 20 MHz channel and HE-SIG B [2] may be transmitted over an even-numbered 20 MHz channel More specifically, in the case of 40 MHz bandwidth, HE-SIG B [1] is transmitted over the first 20 MHz channel and HE-SIG B [2] is transmitted over the second 20 MHz channel. In the case of 80 MHz bandwidth, HE-SIG B [1] is transmitted over the first 20 MHz channel, HE-SIG B [2] is transmitted over the second 20 MHz channel, the same HE-SIG B [1] is transmitted over the third 20 MHz channel and the same HE-SIG B [2] is transmitted over the fourth 20 MHz channel. The same applies to 160 MHz bandwidth.

In this manner, HE-SIG B can be duplicated and transmitted when the bandwidth increases. HE-SIG B which is duplicated and transmitted can hop 20 MHz from a 20 MHz channel through which the same HE-SIG B is transmitted and be transmitted.

Contents of HE-SIG B [1] may differ from contents of HE-SIG B [2]. However, HE-SIG-B [1] fields have the same contents and HE-SIG B [2] fields have the same contents.

According to an embodiment, HE-SIG B [1] may be configured to include only resource allocation information about odd-numbered 20 MHz channels and HE-SIG B [2] may be configured to include only resource allocation information about even-numbered 20 MHz channels. According to another embodiment of the present invention, HE-SIG B [1] can include resource allocation information about at least part of even-numbered 20 MHz channels or HE-SIG B [2] can include resource allocation information about at least part of odd-numbered 20 MHz channels.

HE-SIG B may include a common field and a user specific field. The common field may precede the user specific field. The common field and the user specific field can be identified in units of bits instead of OFDM symbols.

The common field of HE-SIG B includes information about all STAs designated to receive a PPDU in the corresponding bandwidth. The common field may include RU (Resource Unit) allocation information. HE-SIG B [1] fields have the same contents and HE-SIG B [2] fields have the same contents. For example, when four 20 MHz channels constituting 80 MHz are identified as [LL, LR, RL, RR], the common field of HE-SIG B [1] may include a common block for LL and RL and the common field of HE-SIG B [2] may include a common block for LR and RR.

The user specific field of HE-SIG B may include a plurality of user fields and each user field may include information specific to an individual STA designated to receive a PPDU. For example, the user field may include at least one of a station ID, an MCS per STA, the number of streams, Nsts, coding (e.g., indication for usage of LDPC), a DCM indicator and Tx beamforming information. However, the user field is not limited thereto.

Table 2a shows 8-bit indices (referred to as RU allocation indices hereinafter) which can be set in an RU allocation information subfield included in the common field of HE-SIG B (e.g., 20 MHz channel).

TABLE 2a

| 8 bits indices | #1 | #2 | #3 | #4 | #5 | #6 | #7 | #8 | #9 | Number of entries |
|---|---|---|---|---|---|---|---|---|---|---|
| 000 0 0000 | 26 | 26 | 26 | 26 | 26 | 26 | 26 | 26 | 26 | 1 |
| 000 0 0001 | 26 | 26 | 26 | 26 | 26 | 26 | 26 | 52 | | 1 |
| 000 0 0010 | 26 | 26 | 26 | 26 | 26 | 52 | | 26 | 26 | 1 |
| 000 0 0011 | 26 | 26 | 26 | 26 | 26 | 52 | | 52 | | 1 |
| 000 0 0100 | 26 | 26 | 52 | | 26 | 26 | 26 | 26 | 26 | 1 |
| 000 0 0101 | 26 | 26 | 52 | | 26 | 26 | 26 | 52 | | 1 |
| 000 0 0110 | 26 | 26 | 52 | | 26 | 52 | | 26 | 26 | 1 |
| 000 0 0111 | 26 | 26 | 52 | | 26 | 52 | | 52 | | 1 |
| 000 0 1000 | 52 | | 26 | 26 | 26 | 26 | 26 | 26 | 26 | 1 |
| 000 0 1001 | 52 | | 26 | 26 | 26 | 26 | 26 | 52 | | 1 |
| 000 0 1010 | 52 | | 26 | 26 | 26 | 52 | | 26 | 26 | 1 |
| 000 0 1011 | 52 | | 26 | 26 | 26 | 52 | | 52 | | 1 |
| 000 0 1100 | 52 | | 52 | | 26 | 26 | 26 | 26 | 26 | 1 |
| 000 0 1101 | 52 | | 52 | | 26 | 26 | 26 | 52 | | 1 |
| 000 0 1110 | 52 | | 52 | | 26 | 52 | | 26 | 26 | 1 |
| 000 0 1111 | 52 | | 52 | | 26 | 52 | | 52 | | 1 |
| 000 1 xxxx | Definition TBD | | | | | | | | | 16 |
| 00100 yyy | 26 | 26 | 26 | 26 | 26 | | 106 | | | 8 |
| 00101 yyy | 26 | 26 | 52 | | 26 | | 106 | | | 8 |
| 00110 yyy | 52 | | 26 | 26 | 26 | | 106 | | | 8 |
| 00111 yyy | 52 | | 52 | | 26 | | 106 | | | 8 |
| 01000 yyy | | 106 | | | 26 | 26 | 26 | 26 | 26 | 8 |
| 01001 yyy | | 106 | | | 26 | 26 | 26 | 52 | | 8 |
| 01010 yyy | | 106 | | | 26 | 52 | | 26 | 26 | 8 |
| 01011 yyy | | 106 | | | 26 | 52 | | 52 | | 8 |
| 011 xxxxx | Definition TBD | | | | | | | | | 32 |
| 10 yyy yyy | | 106 | | | 26 | | 106 | | | 64 |
| 11 0 00yyy | | | | | 242 | | | | | 8 |
| 11 0 01yyy | | | | | 484 | | | | | 8 |
| 11 0 10yyy | | | | | 996 | | | | | 8 |
| 11 0 11yyy | | | | | 2*996 | | | | | 8 |
| 11 1 xxxxx | Definition TBD | | | | | | | | | 32 |

In Table 2a, RU allocation indices indicate arrangement of RUs and size and position of each RU in the frequency domain. For example, RU allocation index=00000000 indicates that a total of nine RUs, RU#1 to RU #9, are arranged in the frequency domain and sizes of all RUs are set to 26 tones. In addition, the RU allocation index can indicate the number of user fields (e.g., user fields in the user specific field of HE-SIG B) of each RU, which are included in HE-SIG B. A total number of STAs multiplexed to RUs (e.g., MU-MIMO) can be indicated by RU arrangement.

According to the current wireless LAN system, allocation of one RU to multiple STAs is supported only in MU-MIMO. MU-MIMO which multiplexes multiple STAs into one RU can be supported in the case of an RU having a size of greater than 106 tones.

According to MU-MIMO, multiple STAs can be assigned the same RU but data streams transmitted on the RU are not shared by the STAs. That is, although multiple STAs can be multiplexed on an STA common RU in MU-MIMO, each STA can receive only the data stream thereof from among multiple data streams transmitted through the STA common RU.

In Table 2a, the number of entries indicates the number of RU allocation indices having different numbers of user fields per RU (e.g., different numbers of STAs multiplexed into one RU) while having the same RU arrangement. For example, "00100 yyy" corresponds to a total of eight RU allocation indices because yyy can be set to one of 000 to 111. Accordingly, yyy indicates the number of STAs multiplexed into 1 RU in Table 2a. For example, when bits of yyy are sequentially represented as "y[3] y[2] y[1]", the number of STAs multiplexed into 1 RU corresponds to "$2^2$*y[3]+$2^1$*y[2]+$2^0$*y[1]+1". For example, when 11000yyy is used and yyy=011 (e.g., RU allocation index=11000011), three STAs are multiplexed on 242 tones.

The number of user fields included in the user specific field of HE-SIG B can be indicated by a combination of RU arrangement and the number of user fields per RU.

Table 2b shows information on the number of streams, Nsts, which can be set in the user field of the user specific field of HE-SIG B. The information on the number of streams may be called a spatial configuration subfield.

of resource position and size, STA IDs or Rx STAs addresses, an MCS, and MU type (MIMO OFDMA and the like). Specifically, the trigger frame includes at least one of (i) UL MU frame duration, (ii) the number of allocations, N, and (iii) information on each allocation. Information on each allocation may include per user Info. For example, information on each allocation may include at least one of an AID (in the case of MU, as many AIDs as the number of STAs are added), power adjustment, resource (or tone) allocation information (e.g., bitmap), an MCS, the number of streams, Nsts, STBC, coding, and Tx beamforming information.

Figure 19:
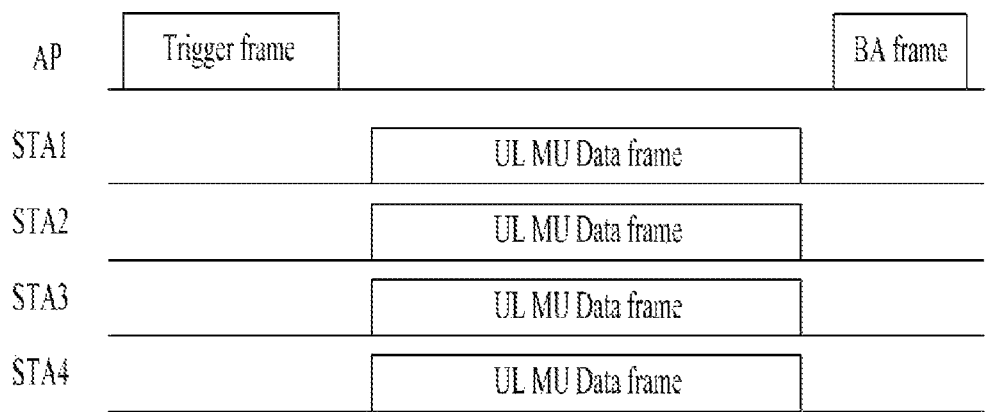
FIG. 19 is a diagram for describing an uplink multi-user transmission situation according to an embodiment of the present invention.

As illustrated in FIG. 19, the AP can acquire TXOP through which the trigger frame will be transmitted through a contention procedure for accessing a medium. STAs can transmit UL data frames in a format indicated by the AP after SIFS of the trigger frame. It is assumed that the AP according to embodiments of the present invention performs acknowledgment for UL MU data frames through a BA (Block ACK) frame.

Figure 20A:
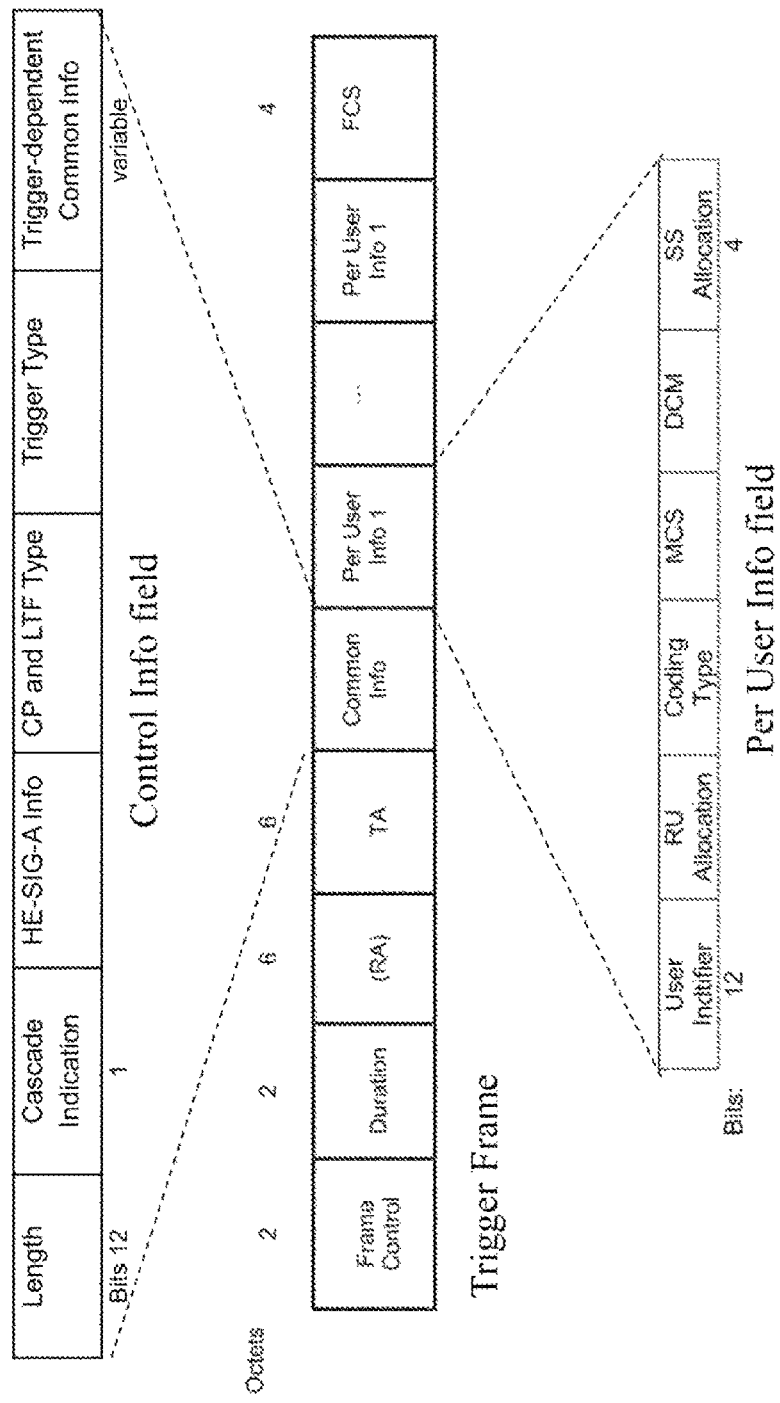
FIG. 20a illustrates a trigger frame format according to an embodiment of the present invention.

FIG. 20a illustrates a trigger frame format according to an embodiment of the present invention.

Referring to FIG. 20a, a trigger frame may include at least one of a frame control field, a duration field, an RA (recipient STA address) field, a TA (transmitting STA address) field, a common information field, one or more individual user information (Per User Info) fields and FCS (Frame Check Sum). The RA field indicates the address or TABLE 2b

| Number of users | B0 . . . B3 | Nsts [1] | Nsts [2] | Nsts [3] | Nsts [4] | Nsts [5] | Nsts [6] | Nsts [7] | Nsts [8] | Total Nsts | Number of Entries |
|---|---|---|---|---|---|---|---|---|---|---|---|
| 2 | 0000~0011 | 1~4 | 1 | | | | | | | 2~5 | 10 |
| | 0100~0110 | 2~4 | 2 | | | | | | | 4~6 | |
| | 0111~1000 | 3~4 | 3 | | | | | | | 6~7 | |
| | 1001 | 4 | 4 | | | | | | | 8 | |
| 3 | 0000~0011 | 1~4 | 1 | 1 | | | | | | 3~6 | 13 |
| | 0100~0110 | 2~4 | 2 | 1 | | | | | | 5~7 | |
| | 0111~1000 | 3~4 | 3 | 1 | | | | | | 7~8 | |
| | 1001~1011 | 2~4 | 2 | 2 | | | | | | 6~8 | |
| | 1100 | 3 | 3 | 2 | | | | | | 8 | |
| 4 | 0000~0011 | 1~4 | 1 | 1 | 1 | | | | | 4~7 | 11 |
| | 0100~0110 | 2~4 | 2 | 1 | 1 | | | | | 6~8 | |
| | 0111 | 3 | 3 | 1 | 1 | | | | | 8 | |
| | 1000~1001 | 2~3 | 2 | 2 | 1 | | | | | 7~8 | |
| | 1010 | 2 | 2 | 2 | 2 | | | | | 8 | |
| 5 | 0000~0011 | 1~4 | 1 | 1 | 1 | 1 | | | | 5~8 | 6 |
| | 0100~0101 | 2~3 | 2 | 1 | 1 | 1 | | | | 7~8 | |
| 6 | 0000~0010 | 1~3 | 1 | 1 | 1 | 1 | 1 | | | 6~8 | 4 |
| | 0011 | 2 | 2 | 1 | 1 | 1 | 1 | | | 8 | |
| 7 | 0000~0001 | 1~2 | 1 | 1 | 1 | 1 | 1 | 1 | | 7~8 | 2 |
| 8 | 0000 | 1 | 1 | 1 | 1 | 1 | 1 | 1 | 1 | 8 | 1 |

In Table 2b, the number of users can be recognized on the basis of the number of user fields of HE-SIG B. 4 bits B0 to B3 which can be set in the spatial configuration sub-field are defined per number of users. Nsts[i] corresponds to an i-th user field. For example, Nsts[i] indicates the number of spatial streams transmitted to an STA identified through the i-th user field.

UL MU Transmission

FIG. 19 is a diagram for describing an uplink multi-user transmission situation according to an embodiment of the present invention.

As described above, the UL MU transmission scheme can be used in an 802.11ax system and can be started when an AP transmits a trigger frame to a plurality of STAs (e.g., STA 1 to STA 4), as shown in FIG. 19. The trigger frame may include UL MU allocation information. For example, the UL MU allocation information may include at least one ID of a recipient STA and may be omitted according to embodiments. The TA field indicates the address of a transmitting STA.

The common information field may include at least one of a length subfield, a cascade indication, an HE-SIG A information subfield, a CP/LTF type subfield, a trigger type subfield and a trigger-dependent common information subfield. The duration subfield indicates an L-SIG duration of a UL MU PPDU. The cascade indication indicates whether there is transmission of a trigger frame following the current trigger frame. The HE-SIG A information subfield indicates content included in HE-SIG A of the UL MU PPDU. The CP/LTF type subfield indicates a CP and an HE LTF type included in the UL MU PPDU. The trigger type subfield indicates the type of a trigger frame. The trigger frame may include common information specific to the corresponding type and type specific individual user information (Per User Info). For example, the trigger type may be set to any one of a basic trigger type (e.g., type 0), a beamforming report poll trigger types (e.g., type 1), a MU-BAR (Multi-user Block Ack Request) type (e.g., type 2) and a MU-RTS (multi-user ready to send) type (e.g., type 3). However, the trigger type is not limited thereto. When the trigger type is MU-BAR, the trigger-dependent common information subfield may include a GCR (Groupcast with Retries) indication and a GCR address.

The individual user information field (Per User Info field) may include at least one of a user ID subfield, an RU (resource unit) allocation subfield, a coding type subfield, an MCS field, a DCM (dual sub-carrier modulation) subfield, an SS (spatial stream) allocation subfield and a trigger dependent Per User Info subfield. The user ID subfield indicates the AID of an STA which will use the corresponding resource unit for transmitting MPDU of UL MU PPDU. The RU allocation subfield indicates a resource unit used by the corresponding STA to transmit the UL MU PPDU. The coding type subfield indicates the coding type of the UL MU PPDU transmitted by the corresponding STA. The MCS subfield indicates the MCS used by the corresponding STA to transmit the UL MU PPDU. The DCM subfield indicates information about double carrier modulation of the UL MU PPDU transmitted by the corresponding STA. The SS allocation subfield indicates information about spatial streams of the UL MU PPDU transmitted by the corresponding STA. When the trigger type is MU-BAR, the trigger dependent Per User Info subfield may include BAR control and BAR information.

Figure 20B:
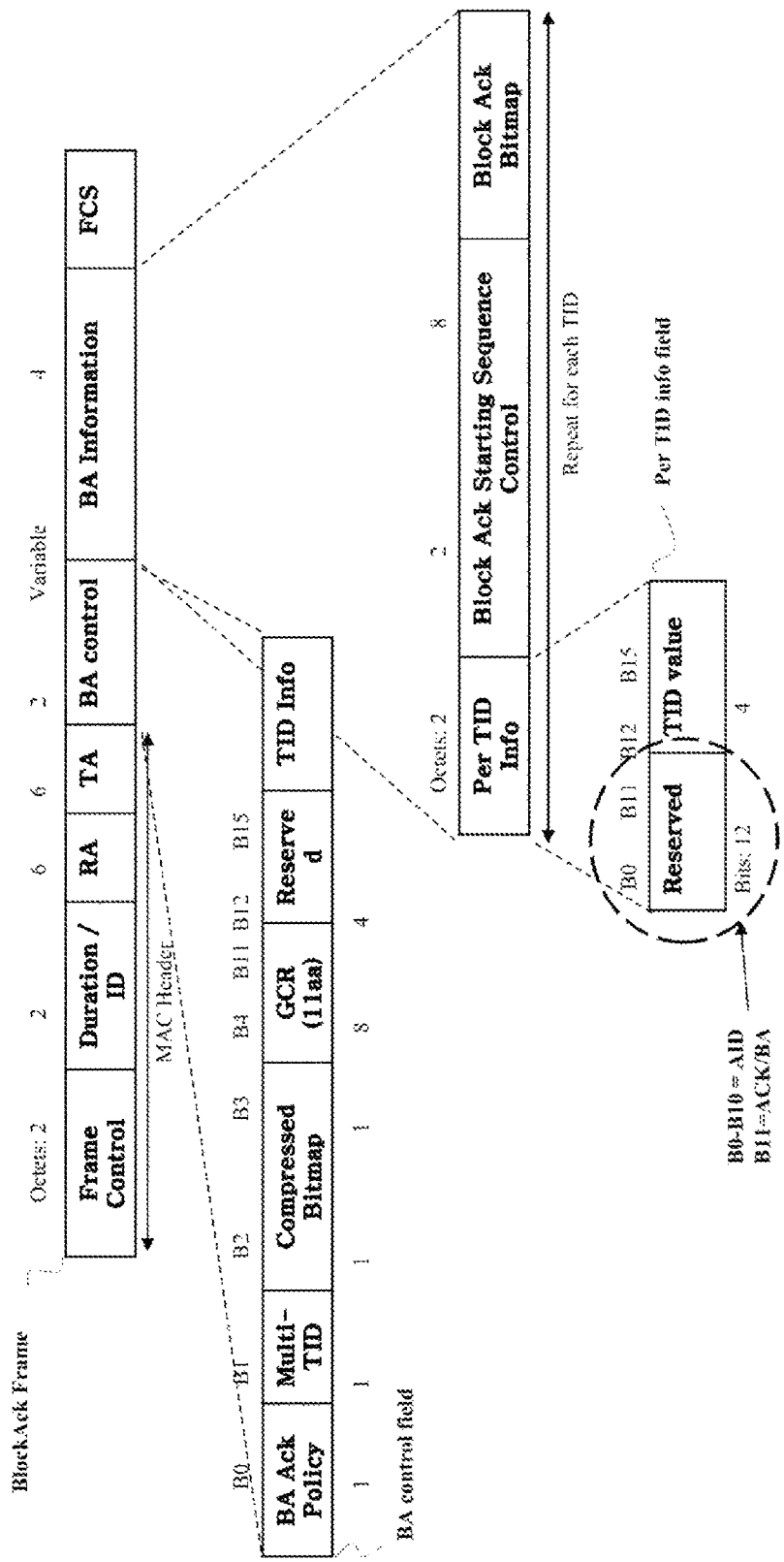
FIG. 20b illustrates a multi-STA BA (referred to as M-BA hereinafter) frame format according to an embodiment of the present invention.

FIG. 20b illustrates a multi-STA BA (referred to as M-BA hereinafter) frame format according to an embodiment of the present invention. An M-BA Frame can be set to a format obtained by modifying part of a multi-TID BlockAck frame. The M-BA frame may be modified in such a manner that the M-BA frame includes an indicator indicating that the corresponding frame is an M-BA frame, a BA information field in the M-BA frame is addressed to different STAs, and bits #0 to #10 (i.e., B0 to B10) of a Per TID information field of the M-BA frame are set to the ID (e.g., PAID or AID) of a receiver which will receive the corresponding BA information field. In this manner, the BA information field including the Per TID information field is specifically set to an individual STA, and thus the BA information field can be provided per STA.

Signaling indicating ACK in the M-BA can be defined as follows. When bit #11 (B11) of the TID information field (Per TID Info field) is set to a specific value (e.g., 0), a BlockAck (BA) bitmap and a BlockAck starting sequence control (BA SC) subfield are not provided in the BA information field and the BA information field can indicate ACK (e.g., successful reception) for an STA having the AID indicated by the TID information field. If bit #11 of the TID information field is set to another value (e.g., 1), the BA bitmap and the BA SC subfield can be provided in the BA information field.

HE PPDU Based M-BA Frame

A description will be given of embodiments in which an M-BA (multi-STA BA) frame is transmitted in the HE-PPDU format (e.g., OFDMA PPDU) in an 11ax system on the basis of the above discussion. In the following description, HE-SIG B can be duplicated and transmitted in units of channels having a predetermined size (e.g., 20 MHz). Embodiments which will be described are indexed for convenience of description, and each embodiment may constitute an independent invention or a combination of embodiments having different indices may constitute an invention.

Embodiment 1: M-BA Frame Transmission Through Full Band

According to an embodiment of the present invention, an M-BA frame including information about ACK/BA for STAs which have transmitted UL MU frames can be transmitted over the entire bandwidth (e.g., 20/40/80 MHz) of UL MU transmission. For example, the M-BA frame may be set to the same size as the entire bandwidth of UL MU transmission.

Figure 21:
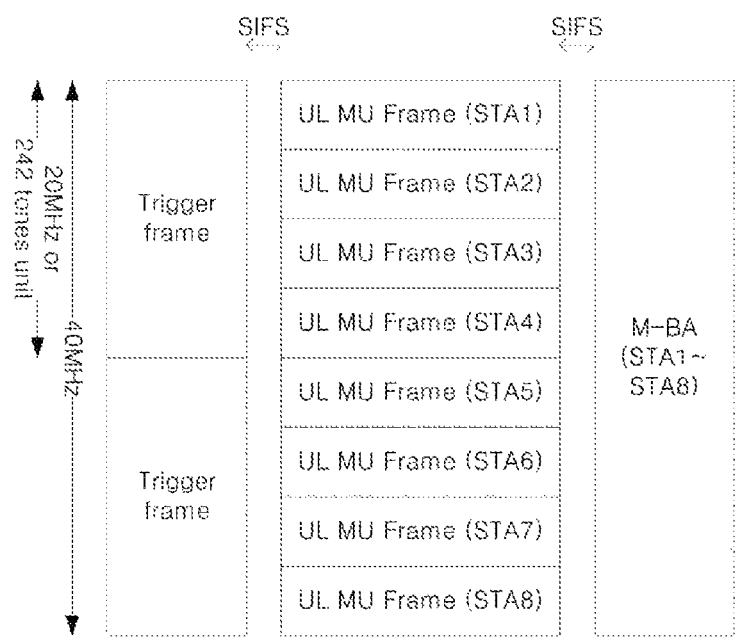
FIG. 21 illustrates an M-BA frame according to an embodiment of the present invention.

FIG. 21 illustrates an M-BA frame according to an embodiment of the present invention. Referring to FIG. 21, when UL MU resources are allocated to STA 1 to STA 8 through a bandwidth of 40 MHz, the M-BA frame for STA 1 to STA 8 is transmitted at 40 MHz.

As shown in Table 3, resource allocation information included in HE-SIG B may be set to the SU format and AID may be set to a broadcast ID. STAs can check whether the M-BA frame includes ACK/BA for the STAs upon reception of the M-BA frame. While Table 3 shows an example in which the M-BA frame transmitted through full band has the SU format, the HE PPDU of the M-BA frame transmitted through full band may be set to the MU format according to another embodiment of the present invention. In another embodiment, although the M-BA frame transmitted through full band is set to the SU format, information shown in Table 3 may be included in a field (e.g., HE-SIG A) other than the HE-SIG B field and the HE-SIG B field may be omitted.

TABLE 3

HE-SIG B {
   MU/SU indicator = SU
   ID = Broadcast ID
   MCS
   STBC
   . . .
}

Embodiment 2: M-BA Frame Transmission in Units of 242 Tones

According to an embodiment of the present invention, the M-BA frame may be transmitted in units of 242 tones (e.g., in units of 20 MHz). For example, 20/40/80 MHz are composed of 1/2/4 242 tones (e.g., 1×242 tones/2×242 tones/4×242 tones) and one M-BA frame can be transmitted per unit corresponding to 242 tones. Each M-BA frame includes ACK/BA information about UL MU frames received on the corresponding 242 tones.

Figure 22:
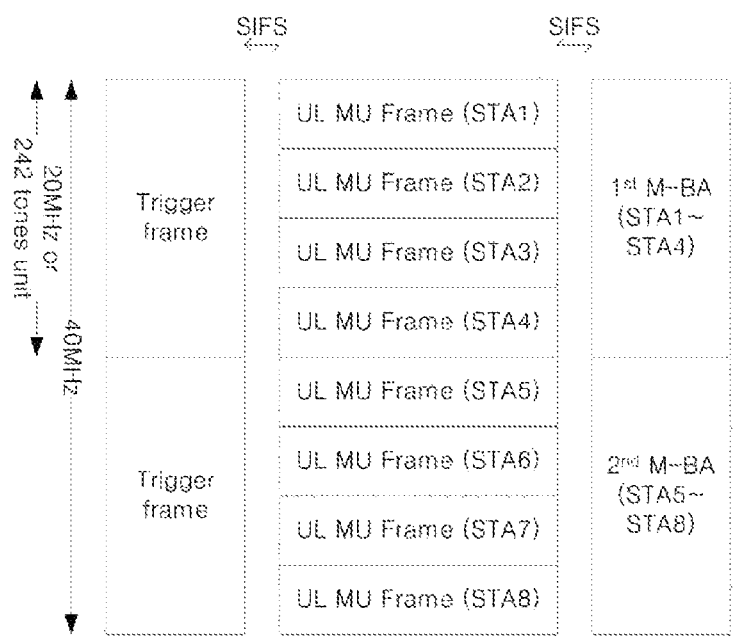
FIG. 22 illustrates M-BA frame transmission according to another embodiment of the present invention.

Referring to FIG. 22, an M-BA frame transmitted through the first 242 tones (e.g., upper 242 tones) includes ACK/BA information about STA 1 to STA 4 and an M-BA frame transmitted through the second 242 tones (e.g., lower 242 tones) includes ACK/BA information about STA 5 to STA 8. For example, when STA 1 has transmitted a UL MU frame using at least some of the first 242 tones, it is desirable that the M-BA frame including ACK/BA information for STA 1 be transmitted through the first 242 tones. Similarly, when STA 5 has transmitted a UL MU frame using at least some of the second 242 tones, it is desirable that the M-BA frame including ACK/BA information for STA 5 be transmitted through the second 242 tones.

However, according to another embodiment of the present invention, an M-BA frame for an STA may be transmitted through 242 tones different from 242 tones through which the STA has transmitted a UL MU frame, but the present invention is not limited thereto.

(1) Embodiment 2-1. Method 1 of Setting ID Information of HE SIG-B Field

In the HE-SIG field (e.g., HE-SIG B) including resource allocation information for an M-BA frame, the ID information subfield can be set to a broadcast ID. In this case, STAs may decode all M-BA frames and check whether BA or ACK therefor is included in corresponding M-BA frames. In the present embodiment, the M-BA frame is transmitted in units of 242 tones and thus HE-SIG B can indicate resource allocation information within 242 tones. Table 4 shows HE-SIG B of the M-BA frame when the broadcast ID is used.

TABLE 4

HE-SIG B{
    Resource allocation (Information for $1^{st}$ allocation, $2^{nd}$ allocation, . . . , nth allocation),
    AID Information ($1^{st}$ allocation ID = broadcast ID, $2^{nd}$ allocation ID = broadcast ID, . . . , nth allocation ID = broadcast ID)
        For STA ID (# of allocations) {
            MCS, STBC, coding, . . .
        }
    }

When the ID information subfield of HE-SIG B is set to the broadcast ID, all STAs need to decode MAC frames (e.g., data) and to check decoding results and thus a processing load is applied to the STAs. According to an embodiment of the present invention, a GID (group ID) instead of the broadcast ID may be used in order to reduce the processing load of STAs. As a GID set in HE-SIG B, a MU GID may be used or a newly allocated GID may be used. Allocation of the GID will be described in detail below.

When a GID is set in HE SIG B, only STAs belonging to the group corresponding to the GID decode allocation information (e.g., HE SIG-B) to receive frames (e.g., payloads). STAs which have received the frame can check whether addresses or ID information thereof are included in MAC frames (e.g., payloads). Table 5 shows an exemplary configuration of HE-SIG B according to the present embodiment.

TABLE 5

HE-SIG B{
    Resource allocation (Information for $1^{st}$ allocation, $2^{nd}$ allocation, . . . , nth allocation),
    AID Information ($1^{st}$ allocation ID = group ID 1, $2^{nd}$ allocation ID = group ID 2, . . . , nth allocation ID = group ID n)
        For STA ID (# of allocations) {
            MCS, STBC, coding, . . .
        }
    }

Meanwhile, STA IDs may be set to each piece of resource allocation information in the HE-SIG B field. An STA ID may be an AID/PAID. For example, as many IDs as the number of STAs allocated resources can be included. According to an embodiment in which individual STA IDs are used in this manner, scheduling flexibility can be achieved but signaling and processing overhead may increase. Table 6 shows an HE-SIG B field in which STA IDs are set per resource allocation. Referring to Table 6, STA IDs can be mapped per resource allocation. Information such as an MCS, STBC and coding information may be provided per resource allocation.

TABLE 6

HE-SIG B{
    Resource allocation (Information for $1^{st}$ allocation, $2^{nd}$ allocation, . . . , nth allocation),
    AID Information ($1^{st}$ allocation ID = {$1^{st}$ STA ID, $2^{nd}$ STA ID, . . . , nth STA ID}, $2^{nd}$ allocation ID = {1st STA ID, 2nd STA ID, . . . , nth STA ID}, . . . , nth allocation ID ={$1^{st}$ STA ID, $2^{nd}$ STA ID, . . . , nth STA ID})
        For STA ID (# of allocations) {
            MCS, STBC, coding, . . .
        }
    }

According to an embodiment of the present invention, a new method of setting resource allocation information of HE-SIG B is proposed in order to reduce HE-SIG B overhead. For example, HE SIG-B may include information indicating whether resources having the same size have been allocated (e.g., same resource size indication). The same resource size indication indicates that OFDMA resources allocated using HE-SIG B have the same size when set to 1, and the allocated resource size may be included in HE-SIG B. The allocated resource size may be set as a predefined resource size index. For example, RS (resource size)=0 indicates a 26-tone unit, RS=1 indicates a 52-tone unit, RS=2 indicates a 108-tone unit and RS=3 indicates a 242-tone unit. However, the present invention is not limited thereto. Tones which remain after allocation of OFDMA resources having the same size in the entire band may not be allocated to STAs or may be used by an AP for other purposes.

A case in which RS=3 (e.g., unit of 242 tones) has been described in the above embodiments. If an ACK/BA frame (e.g., M-BA frame) is transmitted on the basis of OFDMA resources having the same size and a resource size of 26 tones is used, the same resource size indication can be set to 1 and RS=0 can be set.

Figure 23:
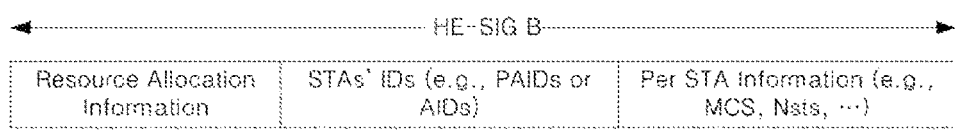
FIG. 23 illustrates an example of an HE-SIG B structure according to an embodiment of the present invention.

FIG. 23 illustrates an example of an HE SIG B structure according to an embodiment of the present invention. Table 7 shows content of the HE SIG B field of FIG. 23.

(ii) Resource allocation information subfield may include same resource size indication. When the same resource size indication is set to 1, RS (resource size) information may be included in the resource allocation information subfield. In another embodiment, RS may be predefined and RS information may be omitted in the resource allocation information subfield. When the same resource size indication is set to 0, the resource allocation information subfield can indicate how resources in units of 242 tones (e.g., 20 MHz) have been allocated. For example, the number of allocations of resources in units of 242 tones (e.g., the number of 20 MHz channels) and positions of the resources (e.g., the position of each 20 MHz channel) can be indicated. In addition, 242 tones allocated to a 242-tone unit and 242 tones allocated to a 26-tone unit can be indicated. For example, 20 MHz allocated to a 242-tone unit and 20 MHz allocated to a 26-tone unit may be indicated through HE-SIG B. If a 20 MHz channel allocated to a 26-tone unit is present, information (e.g., the position and number of 26-tone units) on 26-tone unit allocation included in the 20 MHz channel can be indicated through HE-SIG B.

(iii) STA ID information subfield can indicate an STA ID mapped to each piece of resource allocation information.

(iv) Per STA information subfield may include information necessary for each STA to decode a payload. Per STA information may be set per STA and may include at least one

TABLE 7

HE SIG B {
  If PPDU duration/length//L-SIG are used for PPDU length, they can be omitted.
  Resource allocation information {
    Same resource size indication ( 1 bit, 1: indicates that OFDMA resources have the
same size.)
    If (Same resource size indication == 1) {
      Resource size (2 bits, 0: 26 tones unit, 1: 52 tones unit, 2: 108 tones unit, 3:
242 tones unit)// resource size information may not be included.
    }
    Else {
      Resource allocation information for 242 tones (e.g., the number of
allocations of 242 tones unit and position information, which 242 tones unit is 242 tones
allocation and while 242 tones unit is 26 tones allocation)
      For (the number of 242 tones units corresponding to 26 tones allocation) {
        26 tones unit allocation information included in each 242
        tones unit (position and number)
      }
    }
  }
  STA's IDs Information {//STA ID information mapped to resource allocation information
    Common ID Indication
    If (Common ID Indication == 1) {
      Broadcast ID or STA ID;
    } else {
      For (number of allocations) {
        STA' s AID or Broadcast ID
      }
    }
  }
  Per STA Information {// indicates payload decoding information for each STA.
    For (number of AIDs) {
      Nsts, MCS, STBC, coding, . . .
    }
  }
}

Referring to Table 7, HE-SIG B may include at least one of (i) PPDU duration subfield, (ii) resource allocation information subfield, (iii) STA ID information subfield and (iv) Per STA Information subfield.

(i) PPDU duration subfield may be omitted. For example, when PPDU duration is indicated through the L-SIG field, the PPDU duration subfield can be omitted in HE SIG-B.

of the number of streams, MCS information, information representing whether STBC is used, and coding type information, for example.

When the M-BA frame is transmitted as illustrated in FIG. 22 and the same resource size indication of the HE-SIG B field is set to 1 in Table 7, RS (Resource size)=3 (e.g., 242-tone unit) can be set.

(2) Embodiment 2-2. UL MU Resource Mapping Indication

According to an embodiment of the present invention, a UL MU resource mapping indication instead of a broadcast ID or an STA ID (e.g, AID or PAID) may be included in HE-SIG (e.g., HE-SIG B). The UL MU resource mapping indication can be used when frames are transmitted through a resource unit having a fixed size, for example. Accordingly, the UL MU resource mapping indication can indicate transmission of frames through a resource unit having a fixed size. For example, a resource unit having a fixed size may be a 242-tone unit, but the present invention is not limited thereto and other tone units having different sizes may be used. It is assumed that a resource unit having a fixed size is a 242-tone unit for convenience of description.

Additionally, the UL MU resource mapping indication may represent decoding of only a frame transmitted through 242-tone units to which UL MU frames which have been transmitted immediately prior to the corresponding frame (i.e., before SIFS). Further, the UL MU resource mapping indication represents that a frame transmitted in each 242-tone unit (e.g., M-BA frame including the UL MU resource mapping indication) includes information (e.g., ACK/BA) about UL MU frames (or PPDUs) which have been immediately previously transmitted through OFDMA resources corresponding to the 242-tone unit through which the frame (e.g., M-BA including the UL MU resource mapping indication) is transmitted. In a case in which the UL MU resource mapping indication is used in the embodiment of FIG. 22, the UL MU resource mapping indication can indicate that STA1 to STA 4 should decode only data payloads in which the first M-BA frame is transmitted and STA 5 to STA 8 should decode only data payloads in which the second M-BA frame is transmitted.

When the UL MU resource mapping indication is used, additional OFDMA resource allocation information may not be included in HE-SIG B because a resource region allocated to each STA can be indicated through the UL MU resource mapping indication even if HE-SIG B does not include the OFDMA resource allocation information. For example, an STA can recognize that OFDMA resources are allocated in units of 242 tones (e.g., a resource unit having a fixed size) through the UL MU resource mapping indication and decode a data payload of a corresponding frame. UL MU resource mapping indication=0 can indicate that the resource allocation information subfield is explicitly included in HE-SIG B and transmitted. In addition, when UL MU resource mapping indication=0, an STA can selectively decode a data payload using the resource allocation information subfield included in HE-SIG B. When UL MU resource mapping indication=1, the resource allocation information subfield may be omitted from HE-SIG B. Each bit of the UL MU resource mapping indication may have opposite meaning. Table 8 shows content of HE-SIG B when the UL MU resource mapping indication is used.

TABLE 8

```
HE SIG B {
    If PPDU duration(/length)//L-SIG are used for PPDU length, they can be omitted.
    UL MU Resource Mapping Indication
If (UL MU Resource Mapping Indication == 0) {
    Resource allocation information {
        Same resource size indication ( 1 bit, 1: indicates that OFDMA resources have the
same size.)
        If (Same resource size indication == 1) {
            Resource size (2 bits, 0: 26 tones unit, 1: 52 tones unit, 2: 108 tones unit, 3:
242 tones unit)
        }
        Else {
            Resource allocation information about 242 tones (e.g., the number of
allocations of 242 tones unit and position information, which 242 tones unit corresponds to 242
tones allocation or 26 tones allocation)
            For (the number of 242 tones units corresponding to 26 tones allocation) {
                26 tones unit allocation information included in each 242
                tones unit (position and number)
            }
        }
    }
    STA's IDs Information {//STA ID information mapped to resource allocation information
        Common ID Indication
            If (Common ID Indication == 1) }
                Broadcast ID or STA ID;
            } else {
                For (number of allocations) {
                    STA' s AID or Broadcast ID
                }
            }
        }
        Per STA Information {// indicates payload decoding information for each STA.
            For (number of AIDs) {
                Nsts, MCS, STBC, coding, . . .
            }
        }
    } Else { //UL MU Resource Mapping Indication == 1
        MCS, STBC, Nsts, coding, . . . // can be commonly used for all allocations.
    }
}
```

Referring to Table 8, HE-SIG B may include at least one of (i) PPDU duration subfield and (ii) UL MU resource mapping indication. Redundant description is omitted with respect to Tables 7 and 8.

(ii) When UL resource mapping indicator=0, HE-SIG B may include at least one of a resource allocation information subfield, an STA ID information subfield and a Per STA information subfield (refer to Table 7).

(ii) When UL resource mapping indication=1, at least one of the resource allocation information subfield, the STA ID information subfield and the Per STA information subfield may be omitted in HE SIG B. Information for payload decoding (e.g., information about MCS, STBC, Nsts and coding) may be commonly used for all resource allocations.

According to another embodiment of the present invention, a UL MU resource mapping ID may be used in HE-SIG B similarly to the UL resource mapping indication. The UL MU resource mapping ID may have multiple indices. For example, each index of the UL MU resource mapping ID may be used as follows.

(i) UL MU resource mapping ID=0 may indicate that there is no UL MU mapping (i.e., No UL MU mapping). In this case, the resource allocation information subfield can be explicitly included in HE-SIG B. UL MU resource mapping ID=0 has a meaning similar to the UL MU resource mapping indication=0.

(ii) UL MU resource mapping ID=1 has a meaning similar to the UL MU resource mapping indication=1. For example, UL MU resource mapping ID=1 can indicate that each data payload is transmitted in a 242-tone unit (e.g., resource unit having a fixed size).

Figure 24:
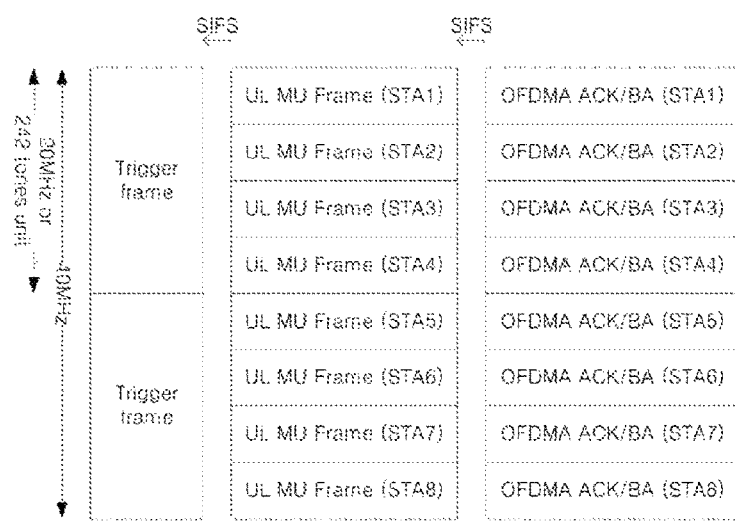
FIG. 24 illustrates an example in which a UL MU resource mapping ID is used according to an embodiment of the present invention.

(iii) UL MU resource mapping ID=2 can indicate that OFDMA resource allocation using HE-SIG B is equally mapped to previously transmitted UL MU resources. UL MU resource mapping ID=2 may be used for OFDMA ACK/BA transmission. FIG. 24 illustrates an embodiment in which UL MU resource mapping ID=2 is used. Referring to FIG. 24, each STA can receive OFDMA ACK/BA through the same resource as the resource through which the STA has transmitted a UL MU frame thereof.

The UL MU resource mapping ID or the UL MU resource mapping indication may be called different names and may be used for other purposes. Further, the UL MU resource mapping ID or the UL MU resource mapping indication may be transmitted through a different preamble part such as HE-SIG A.

(3) Embodiment 2-3. Method 2 of Setting ID Information of HE SIG-B Field

According to an embodiment of the present invention, Per STA ID instead of the broadcast ID may be included in HE-SIG (e.g., HE-SIG B) and transmitted. For example, when an M-BA frame transmitted through the first M-BA resource (e.g., first 242-tone unit) includes ACK/BA for STA 1 to STA 4, the M-BA frame may include IDs (e.g., AIDs or PAIDs of STA 1 to STA 4) of STAs allocated the first M-BA resource. Table 9 shows content of an HE-SIG B field according to the present embodiment.

TABLE 9

```
HE-SIG B{
    Resource allocation information (N: number of resource allocations)// methods described in
embodiment 2-1 or 2-2 can be used.
        STA ID Information {
            For (N) }
            # of STAs (M)
            For (M) {
                AID/PAID
            }
        }
    }
    [Nsts, MCS, STBC, coding, . . . ] //only one piece of information may be commonly set for
all allocations or the information may be set per allocation.
}
```

Referring to Table 9, the HE-SIG B field may include at least one of (i) resource allocation information subfield, (ii) STA ID information subfield and (iii) information for payload decoding, for example, the number of streams, MCS and coding information. Redundant description is omitted with respect to Tables 7, 8 and 9.

(i) The resource allocation information subfield can be set through the method described in embodiment 2-1 or 2-2 but the present invention is not limited thereto.

(ii) The STA ID information subfield can be set per resource allocation. For example, when N resource allocations are provided, the STA ID information can be set for each of the N resource allocations. Multiple STAs may receive ACK/BA through one resource allocation and thus STA IDs (e.g., AIDs or PAIDs) of STAs which will receive ACK/BA can be set per resource allocation through each resource allocation. In this manner, multiple STAs can share one resource allocation. STAs which share resource allocation may share a data stream transmitted through a payload. That is, one data stream can be shared by multiple STAs and STAs sharing a data stream can be indicated through the STA ID information.

(iii) With respect to the information for payload decoding, only one piece of information may be commonly set for all resource allocations or the information may be set per resource allocation.

(4) Embodiment 2-4. Method 3 of Setting ID Information of HE SIG-B Field

According to an embodiment of the present invention, a GID (group ID) instead of per STA ID (e.g., AID or PAID) may be used in HE-SIG (e.g., HE-SIG B). When ACK/BA for STAs (e.g., STA 1 to STA 4) belonging to group 1 is transmitted through the first M-BA resource (e.g., first 242-tone unit), an M-BA frame transmitted through the first M-BA resource (e.g., first 242-tone unit) may include the GID (e.g., GID of group 1) of a group which will use the first M-BA resource. Table 10 show content of HE-SIG B according to the present embodiment.

TABLE 10

```
HE-SIG B {
  Resource allocation information (N: number of resource allocations) // methods described in
embodiment 2-1 or 2-2 can be used.
    STA ID Information {
      For (N) {
        Group ID // as many GIDs as the number of allocations can be included.
      }
    }
    [Nsts, MCS, STBC, coding, . . . ] //only one piece of information may be commonly set for
all allocations or the information may be set per allocation.
}
```

Referring to Table 10, the HE-SIG field may include at least one of (i) resource allocation information subfield, (ii) STA ID information subfield and (iii) information for payload decoding, for example, the number of streams, MCS and coding information. Redundant description is omitted with respect to Tables 7 to 10.

(ii) The STA ID information subfield can be set per resource allocation. For example, when N resource allocations are provided, the STA ID information can be set for each of the N resource allocations. One resource allocation may correspond to one group. Accordingly, a GID can be set per resource allocation.

The information fields (e.g., the same resource size indication, the UL MU resource mapping indication, etc.) included in HE-SIG B for transmitting the M-BS frame in the form of OFDMA, which have been described in the above-described embodiments, are not limited to the purpose of transmitting the M-BA frame and may be used to transmit other DL frames (e.g., BA, ACK, BAR, NDPA, RTS and trigger frame) in the 11ax PPDU format (e.g., HE PPDU). In addition, the information fields (e.g., the same resource size indication, the UL MU resource mapping indication, etc.) included in HE-SIG B for transmitting the M-BS frame in the form of OFDMA, which have been described in the above-described embodiments, may be transmitted through other PHY preamble parts (e.g., HE-SIG A and HE-SIG C) as well as HE-SIG B.

The information fields (e.g., the same resource size indication, the UL MU resource mapping indication, etc.) included in HE-SIG B may be transmitted through a trigger frame.

Embodiment 3: OFDMA Based Duplicate Transmission

According to an embodiment of the present invention, when an AP transmits an M-BA frame on the basis of OFDMA (e.g., in the HE PPDU format), the AP may duplicate and transmit the M-BA frame in units of predetermined resources (e.g., 242-tone unit).

Figure 25:
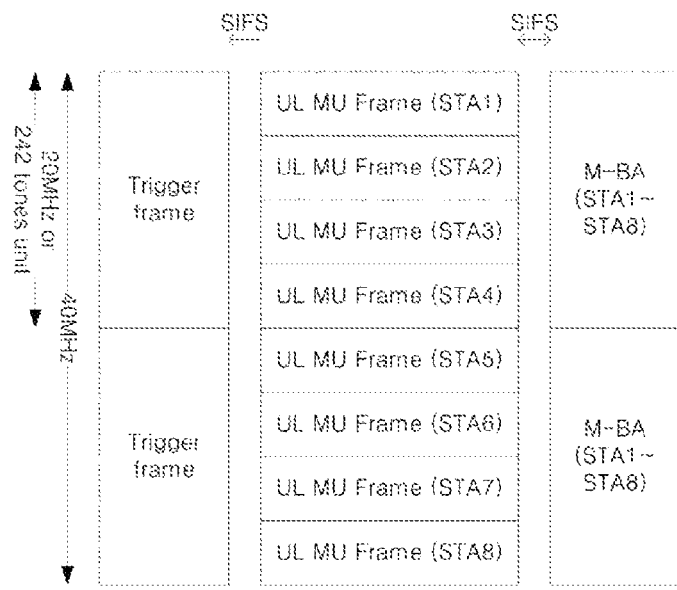
FIG. 25 illustrates an example in which an M-BA frame is repeatedly transmitted in units of 242 tones according to an embodiment of the present invention.

FIG. 25 illustrates an embodiment in which the M-BA frame is duplicated and transmitted in units of 242 tones. Although a case in which a predetermined resource unit is a 242-tone unit (e.g., 20 MHz) is illustrated for convenience of description, the present invention is not limited thereto.

Referring to FIG. 25, the M-BA frame transmitted through each 242-tone unit may include ACK/BA information for UL MU frames of all STAs, STA 1 to STA 8. For example, the M-BA frame transmitted through each 242-tone unit may include not only ACK/BA information of UL MU frames received through the 242-tone unit but also ACK/BA information about UL MU frames of full band (or other bands). The M-BA frame configured in this manner may be duplicated and transmitted in units of 242 tones. Here, HE-SIG (e.g., HE-SIG A or HE-SIG B) of the M-BA frame may include information indicating that the M-BA frame is duplicated in units of 242 tones. For example, the information indicating that the M-BA frame is duplicated in units of 242 tones may be a duplicate transmission indication or HE-SIG B type information, but the present invention is not limited thereto. Table 11 shows content of HE-SIG B according to the present embodiment.

TABLE 11

```
HE-SIG B {
  PPDU duration
  Duplicate transmission // information representing whether a frame is duplicated in units
of 242 tones
    If (Duplicate transmission = 1) {
      ID information
      Data payload decoding information (e.g., MCS, coding, Nsts, STBC, etc.0
    }else {
      . . .
    }
}
```

Referring to Table 11, a duplicate transmission subfield is information representing whether the corresponding frame (e.g., M-BA frame) is duplicated in units of 242 tones. For example, when duplicate transmission=1, the corresponding frame can be duplicated in units of 242 tones. If the corresponding frame is duplicated in units of 242 tones (e.g., duplicate transmission=1), the ID information subfield may be set to one of a broadcast ID, GID and STA IDs (e.g., AIDs/PAIDs of STAs which need to decode the frame). In addition, one piece of data payload decoding information may be commonly set for all STAs and transmitted.

The information representing that the M-BA frame is duplicated and transmitted in units of 242 tones on the basis of OFDMA may be transmitted through a trigger frame.

Methods of allocating IDs (e.g., ID, multicast ID and broadcast ID) mentioned in the above-described embodiments to STAs will be described. Although GID allocation is assumed in the following description, embodiments which will be described below may be used for multicast ID or broadcast ID.

According to an embodiment of the present invention, GIDs may be allocated to STAs through a trigger frame. For example, an AP can simultaneously allocate resources and GIDs to STAs through a trigger frame.

GIDs may be allocated using at least part of an AID range or using at least some of group IDs of MU-MIMO.

The present invention is not limited to a method of explicitly allocating GIDs through a trigger frame. For example, GIDs may be reserved in advance. Specifically, at least some of IDs used in HE-SIG B (e.g., last part and first part) may be reserved and used for a GID. If the M-BA frame is transmitted in units of 20 MHz (e.g., in units of 242 tones), as in the above-described embodiments, a group ID reserved for each 20 MHz channel (e.g., 242-tone resource unit) can be mapped to and used for the 20 MHz channel.

For example, if GIDs=a, b, c, d are used for M-BA frame transmission and an M-BA frame is transmitted in a bandwidth of 80 MHz, GID=a, GID=b, GID=c and GID=d can be respectively mapped to and used for the first 20 MHz (e.g., 242-tone RU), the second 20 MHz, the third 20 MHz and the fourth 20 MHz.

Such GIDs may be implicitly allocated to STAs. For example, a GID may be implicitly indicated through a 20 MHz channel allocated to an STA. Specifically, GID=a may be allocated to STAs assigned 20 MHz channel 1 (e.g., 242-tone RU 1), GID=b may be allocated to STAs assigned 20 MHz channel 2 (e.g., 242-tone RU 2), GID=c may be allocated to STAs assigned 20 MHz channel 3 (e.g., 242-tone RU 3), and GID=d may be allocated to STAs assigned 20 MHz channel 4 (e.g., 242-tone RU 4).

According to an embodiment, only one GID (e.g., GID=a) among available GIDs may be explicitly indicated through a trigger frame and the remaining GIDs may be implicitly signaled to STAs. For example, when an AP explicitly signals one GID through a trigger frame, other available GIDs may be implicitly specified on the basis of the signaled GID.

Specifically, it is assumed that the AP signals only GID 1 (e.g., GID=a) and OFDMA resource allocation for M-BA frame transmission is set to two 20 MHz channels (e.g., two 242-tone RUs). Here, the first 20 MHz channel may be mapped to GID 1 (e.g., GID=a) and the second 20 MHz channel may be mapped to GID 2 (e.g., GID=a+1). The value of GID 2 can be determined using GID 1.

A total number of GIDs to be allocated may be determined depending on the entire bandwidth. For example, 1/2/4 GID(s) may be used at 20/40/80 MHz.

Implicitly determined GIDs may have values sequentially following an explicitly signaled GID. For example, signaled GID 1 may be mapped to the first 20 MHz channel and other GIDs having values following GID 1 may be sequentially mapped to subsequent 20 MHz channels.

In the case of a transmission bandwidth of 20 MHz, GID 1 (e.g., GID=a) transmitted through a trigger frame may be used for an OFDMA resource allocation unit (e.g., 20 MHZ channel 1) mapped to the first 242 tones and transmitted.

In the case of a transmission bandwidth of 40 MHz, GID 1 (e.g., GID=a) transmitted through a trigger frame may be used for an OFDMA resource allocation unit (e.g., 20 MHZ channel 1) mapped to the first 242 tones. GID 2 (e.g., GID=a+1) determined from the value of GID 1 may be used for an OFDMA resource allocation unit (e.g., 20 MHZ channel 2) mapped to the second 242 tones.

In the case of a transmission bandwidth of 80 MHz, GID 1 (e.g., GID=a) transmitted through a trigger frame may be used for an OFDMA resource allocation unit (e.g., 20 MHZ channel 1) mapped to the first 242 tones. GID 2 (e.g., GID=a+1) determined from the value of GID 1 may be used for an OFDMA resource allocation unit (e.g., 20 MHZ channel 2) mapped to the second 242 tones. GID 3 (e.g., GID=a+2) may be used for an OFDMA resource allocation unit (e.g., 20 MHZ channel 3) mapped to the third 242 tones. GID 4 (e.g., GID=a+3) may be used for an OFDMA resource allocation unit (e.g., 20 MHZ channel 4) mapped to the fourth 242 tones.

In the case of a transmission bandwidth of 160 MHz, mapping between GIDs and 20 MHz channels can be defined according to the above-described method.

GIDs may be allocated through not only a trigger frame but also other frames before trigger frame transmission.

The above-described M-BA frame transmission methods may be applied irrespective of whether the HE-SIG B structure is based on encoding per STA, joint encoding or independent coding. Usage of GID may also be applied irrespective of the HE-SIG B structure.

A description will be given of methods of allocating GIDs for M-BA to STAs when an AP allocates GIDs through a trigger frame in order to transmit an M-BA frame through OFDMA (e.g., HE PPDU).

Embodiment 4. GID Allocation Method 1 Through Trigger Frame

According to an embodiment of the present invention, a GID may be allocated per STA through a trigger frame. Table 12 shows content of a trigger frame according to the present embodiment.

TABLE 12

Contents of Trigger frame {
  BSSID/PBSSID
  UL PPDU Duration/length
  TXOP duration
  Number of STA(N)
  For (i = 0: i<N; i++) {
    STA ID/Address
    Group ID
    Resource position and length
    Data frame encoding information
  (e.g. MCS, coding rate, STBC, BF, Nsts, etc.)
    Power adjustment
  }

Referring to Table 12, an AP may allocate a GID per STA through the trigger frame. Then, the AP may set the ID subfield of HE-SIG B included in an M-BA frame to the GID allocated through the trigger frame and transmit the M-BA frame according to OFDMA. In reception of the M-BA frame transmitted on the basis of OFDMA, STAs allocated GIDs through the trigger frame may receive the M-BA frame using the GIDs allocated thereto after transmitting UL MU frames. For example, STAs may decode OFDMA frames allocated thereto using GIDs thereof.

When a GID is indicated per STA as in the present embodiment, GID signaling overhead corresponding to (GID size×total number of STAs) is generated. For example, when a GID is 11 bits and eight STAs are scheduled, 88-bit overhead is generated.

A description will be given of a method for reducing GID signaling overhead in GID allocation.

Embodiment 5. GID Allocation Method 2 Through Trigger Frame

According to an embodiment of the present invention, an AP may embed one (e.g., GID having a lowest value) of GIDs to be allocated and the number of GIDs to be allocated in a trigger frame and indicate, to STAs, GIDs to be allocated thereto through GID indices. Table 12 shows contents of a trigger frame according to the present embodiment.

TABLE 12

Contents of Trigger frame {
  BSSID/PBSSID
  UL PPDU Duration/length
  TXOP duration
  Number of STA(N)
  Lowest Group ID (GID), e.g., size = 11 bits
  Number of Group ID e.g., size = 3 bits (X)
  For (i = 0: i<N; i++) {
    STA ID/Address
    GID index, e.g., size = ceiling (log$_2$ X)
    Resource position and length
    Data frame encoding information (e.g. MCS, coding rate, STBC, BF, Nsts, etc.)
    Power adjustment
  }
}

Referring to Table 13, when it is assumed that a GID having the lowest value among GIDs to be allocated is 3 (e.g., b00000000011) and the number of GIDs to be allocated is 4, the GID index size may be set to 2 bits. For example, the GID index size may be ceiling (log$_2$ N) where N is a total number of GIDs to be allocated. In Table 13, it is assumed that N=4. In addition, the GID length is assumed to be 11 bits, but the present invention is not limited thereto.

If eight STAs are present, total overhead of GID allocation to the eight STAs may reach 11+3+16 (=2*8)=30 bits. Here, 11 represents the number of bits necessary to indicate the lowest GID, 3 represents the number of bits necessary to indicate a total number of GIDs to be allocated, and 16 represents the number of bits necessary to indicate a 2-bit GID index to each of the eight STAs.

Therefore, according to GID allocation method 2, overhead is reduced by about 65% compared to GID allocation method 1.

In the embodiment shown in Table 13, four GIDs (e.g., GID=3, GID=4, GID=5, GID=6) are sequentially allocated, GID index=00 indicates GID=3, GID index=01 indicates GID=4, GID index=10 indicates GID=5, and GID index=11 indicates GID=6.

As another example, when a total number of GIDs to be allocated is 2, the GID index size is 1 bit. When there are three STAs, GID allocation overhead reaches 11+3+8=22 bits. Overhead is reduced by about 75% compared to GID allocation method 1. Here, GID index=0 indicates GID=3 and GID index=1 indicates GID=4.

The present embodiment may be used when GID values to be allocated are consecutive.

Embodiment 6. GID Allocation Method 3 Through Trigger Frame

According to an embodiment of the present invention, an AP may allocate inconsecutive GIDs to STAs. As a method of allocating inconsecutive GIDs, a GID bitmap may be used. In the GID bitmap, each bit position may be mapped to a GID.

When the GID bitmap is used, information on a total number of GIDs to be allocated may be omitted. For example, a total number of bits set to 1 in the GID bitmap may indicate a total number K of GIDs to be allocated. Accordingly, the GID index size is ceiling (log$_2$ K). ceiling (A) means a minimum integer having a value equal to or greater than A.

Table 14 shows content of a trigger frame according to the present embodiment.

TABLE 14

Contents of Trigger frame {
  BSSTD/PBSSID
  UL PPDU Duration /length
  TXOP duration
  Number of STA(N)
  Lowest Group ID (GID), e.g., size = 11 bits
  Group ID Bitmap(e.g., size= 8 bits, Number of 1 in the bitmap =K)
  For (1 = 0; i<N;i++) {
    STA ID/Address
    GID index, e.g., size = ceiling (log$_2$ K)
    Resource position and length
    Data frame encoding information (e.g.. MCS, coding rate, STBC, BF, Nsts, etc.)
    Power adjustment
  }
}

In the example of Table 14, it is assumed that the lowest GID value is 3, the number of STAs is 8 and the number of bits set to 1 in the GID bitmap is 4. Accordingly, the GID index size is 2 bits. Total overhead for allocating GIDs to eight STAs is 11+8+16 (2*8)=35 bits. Here, 11 represents the number of bits necessary to indicate the lowest GID values (e.g., b00000000011), 8 represents the number of bits of the GID bitmap, and 16 represents the number of bits necessary to indicate a 2-bit GID index to the eight STAs. Since the GID bitmap is 8 bits, four GIDs among eight GIDs in the range of 3 to 11 can be allocated through the GID bitmap.

As another example, when the number of bits set to 1 in the GID bitmap (i.e., the total number of GIDs to be allocated) is 2, the GID index size is 1 bit. When the number of STAs is 3, GID allocation overhead reaches 11+8+8=27 bits. Here, GID index=0 may indicate GID=3 and GID index=1 may indicate GID=4. Since the GID bitmap is 8 bits, two GIDs among eight GIDs in the range of 3 to 11 can be allocated through the GID bitmap GID.

As described above, the M-BA frame can be transmitted on the basis of OFDMA PPDU (e.g., HE PPDU) according to embodiments of the present invention. The HE-SIG B field for M-BA frame transmission and OFDMA M-BA frame signaling methods have been described. In addition, a broadcast ID, multicast ID, GID and/or Per STA ID (e.g., PAID or AID) have been exemplified as IDs which can be set in the ID information field of the HE-SIG field of the HE PPDU based M-BA frame. Furthermore, embodiments of allocating GIDs to STAs have been described.

M-BA ID

In the following description, ID information set in the HE-SIG B field of the HE PPDU based M-BA frame is collectively called "M-BA ID". Other embodiments with respect to M-BA ID allocation will be described on the basis discussion of the above-described embodiment. While embodiments which will be described below may be combined with the above-described embodiments, they may constitute a separate invention.

In an embodiment of the present invention, an AP may allocate an STA ID for M-BA, for example, an M-BA ID, to an STA through a trigger frame. STA IDs which are not allocated to STAs and thus are not used from among STA IDs for identifying individual STAs may be allocated as M-BA IDs. M-BA IDs allocated in this manner may be valid only for a corresponding TXOP (transmission opportunity). For example, an STA cannot use an M-BA ID allocated thereto through a trigger frame when TXOP expires.

The AP may transmit M-BA frames according to OFDMA using M-BA IDs allocated to STAs. Different M-BA IDs may be used for resource units in which respective M-BA frames are transmitted.

An STA decodes an M-BA frame using the M-BA ID allocated thereto. When both the M-BA ID and the STA ID allocated to the STA are included in HE-SIG B of an OFDMA PPDU, the STA may ignore a data payload indicated by the M-BA ID. For example, the STA may attempt to decode only a data payload indicated by the STA ID.

Figure 26:
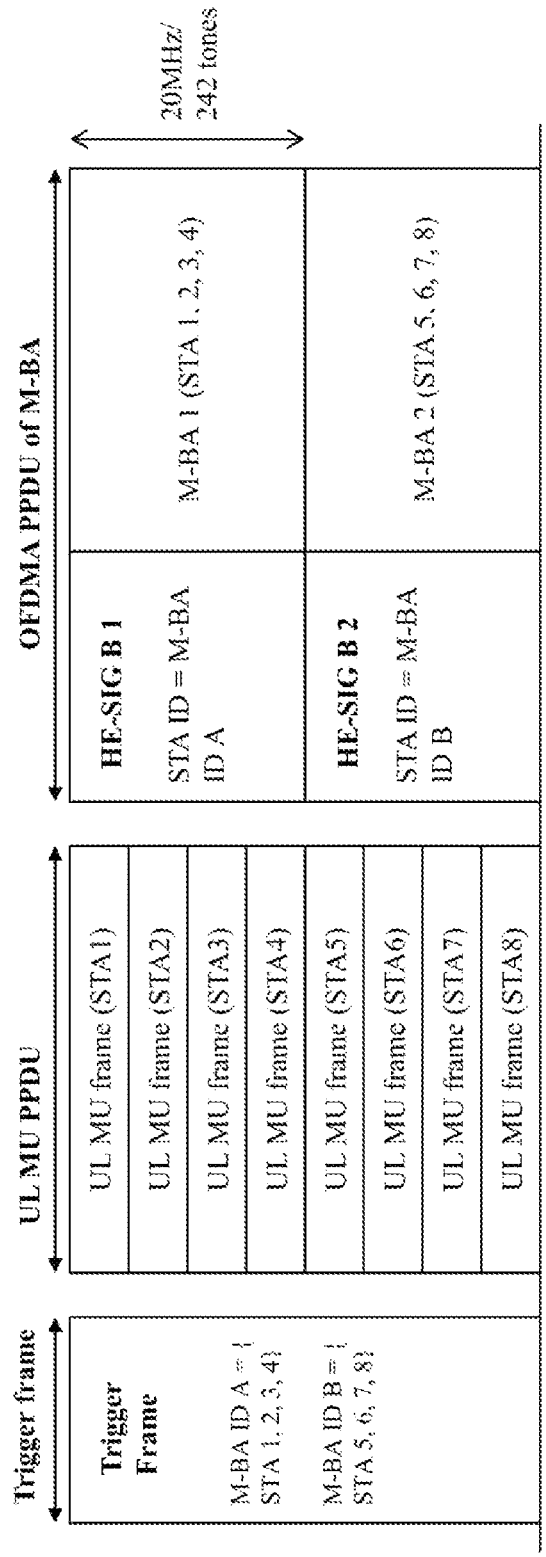
FIG. 26 illustrates M-BA frame transmission according to an embodiment of the present invention.

FIG. 26 illustrates M-BA frame signaling according to an embodiment of the present invention.

Referring to FIG. 26, one M-BA ID may be allocated to multiple STAs. For example, the AP may allocate M-BA ID A to STAs 1, 2, 3 and 4 and allocate M-BA ID B to STAs 5, 6, 7 and 8 through a trigger frame.

Each STA transmits a UL MU PPDU on the basis of the trigger frame.

Upon reception of UL MU PPDUs, the AP transmits an M-BA frame including ACK/BA for STAs using an HE PPDU (e.g., OFDMA PPDU). For example, the M-BA frame may be transmitted in units of 20 MHz channels. M-BA 1 payload includes ACK/BA for STAs 1, 2, 3 and 4 and is transmitted through 20 MHz channel 1. M-BA 2 payload includes ACK/BA for STAs 5, 6, 7 and 8 and is transmitted through 20 MHz channel 2.

In an embodiment, each STA may receive the M-BA frame through a 20 MHz channel to which resources used by the STA to transmit a UL MU PPDU belong. The AP may allocate resource units belonging to the same 20 MHz channel to STAs allocated the same M-BA ID.

M-BA 1 payload may be received through HE-SIG B 1 and M-BA 2 payload may be received through HE-SIG B 2. For example, M-BA 1 payload may be received on the basis of M-BA ID A set in the STA ID subfield of HE-SIG B1 and M-BA 2 payload may be received on the basis of M-BA ID B set in the STA ID subfield of HE-SIG B2.

Embodiment 7. Common Information Field and Per User Field of Trigger Frame

According to an embodiment of the present invention, an AP may allocate M-BA IDs to STAs through a trigger frame when the trigger type subfield of the common information field of the trigger frame is set to a specific value (e.g., 0=basic trigger).

(1) Embodiment 7-1. Option 1 for M-BA ID Allocation

According to an embodiment, an M-BA ID (e.g., 11 bits) to be allocated to each STA may be included in the Per User Info field of each STA. For example, each M-BA ID may be included in the trigger-dependent Per User Info of the Per User Info field.

Figure 27A:
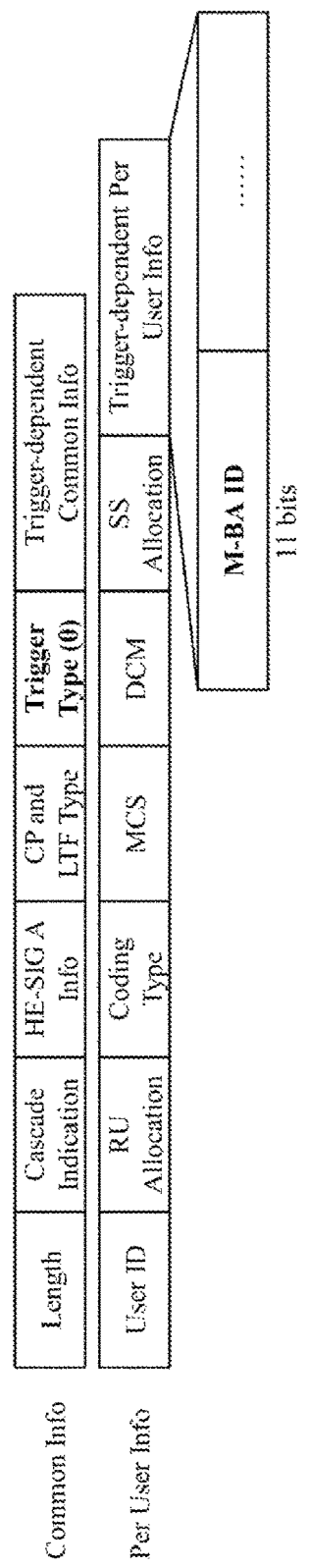
FIGS. 27a to 27o illustrate trigger frames according to embodiments of the present invention.

FIG. 27a illustrates the common information field and the Per User field of the trigger frame according to option 1. Referring to FIG. 27a, the trigger type subfield included in the common information field of the trigger frame may be set to a specific value, for example, 0=basic trigger. When the trigger type subfield is set to 0, M-BA ID can be set in the Per User Info field of the trigger frame. Although an 11-bit M-BA ID is set in the trigger-dependent Per User Info subfield in FIG. 27a, the present invention is not limited thereto. When the AP intends to allocate M-BA ID A to STA 1, as shown in FIG. 26, the trigger-dependent Per User Info subfield of the Per User Info field (e.g., Per User Info field in which the ID of STA 1 has been set in the User ID subfield) of STA 1 may include M-BA ID A. In addition, when the AP intends to allocate M-BA ID B to STA 5, the trigger-dependent Per User Info subfield of the Per User Info field (e.g., Per User Info field in which the ID of STA 5 has been set in the User ID subfield) of STA 5 may include M-BA ID B.

(2) Embodiment 7-2. Option 2 for M-BA ID Allocation

According to another embodiment, a specific M-BA ID among M-BA IDs (e.g., 11 bits) to be allocated may be included in the common information field. For example, the specific M-BA ID may be included in the trigger-dependent common information subfield of the common information field. The specific M-BA ID is referred to by each STA to specify an actual M-BA ID allocated thereto. In order to prevent confusion between an M-BA ID actually allocated to an STA and the specific M-BA ID referred to by the STA, the specific M-BA ID referred to by the STA is called a reference M-BA ID. The reference M-BA ID may be a first M-BA ID (e.g., a leading M-BA ID) having the lowest value among M-BA IDs to be allocated by an AP but present invention is not limited thereto. In addition, an M-BA ID index (e.g., 3 bits) may be included in the Per User Info field. For example, the M-BA ID index may be included in the trigger-dependent Per User Info subfield of the Per User Info field.

A reference M-BA ID is signaled through the common information field of the trigger frame and thus is STA common information, whereas an M-BA ID is signaled through the Per User Info field and thus is STA specific information. For example, each STA may recognize an M-BA ID allocated thereto by combining the STA common reference M-BA ID and an STA specific M-BA ID index.

The M-BA ID index indicates each M-BA ID to be allocated to each STA. For example, M-BA ID index=0 may indicate that a reference M-BA ID has been allocated to a corresponding STA, M-BA ID index=1 may indicate that a reference M-BA ID+1 has been allocated to a corresponding STA, M-BA ID index=2 may indicate that a reference M-BA ID+2 has been allocated to a corresponding STA, and M-BA ID index=N may indicate that a reference M-BA ID+N has been allocated to a corresponding STA.

The length of the M-BA ID index is variable. For example, the length of the M-BA ID index may be determined on the basis of a total number of M-BA IDs to be allocated. If four or six M-BA IDs are provided, the length of the M-BA ID index may be 2 bits or 4 bits.

Figure 27B:
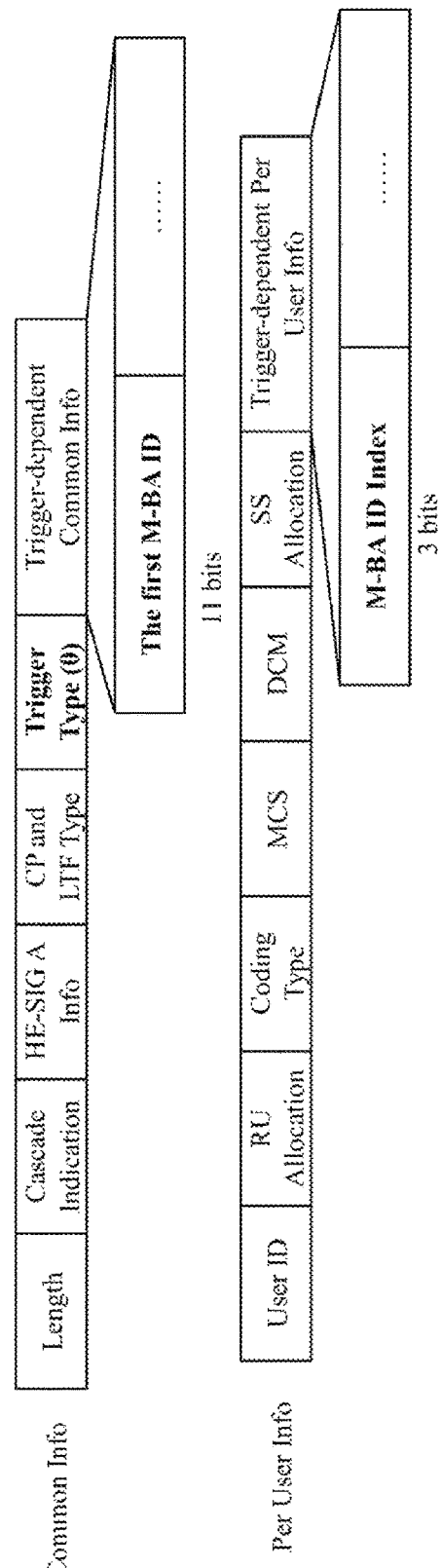
Figure 27C:
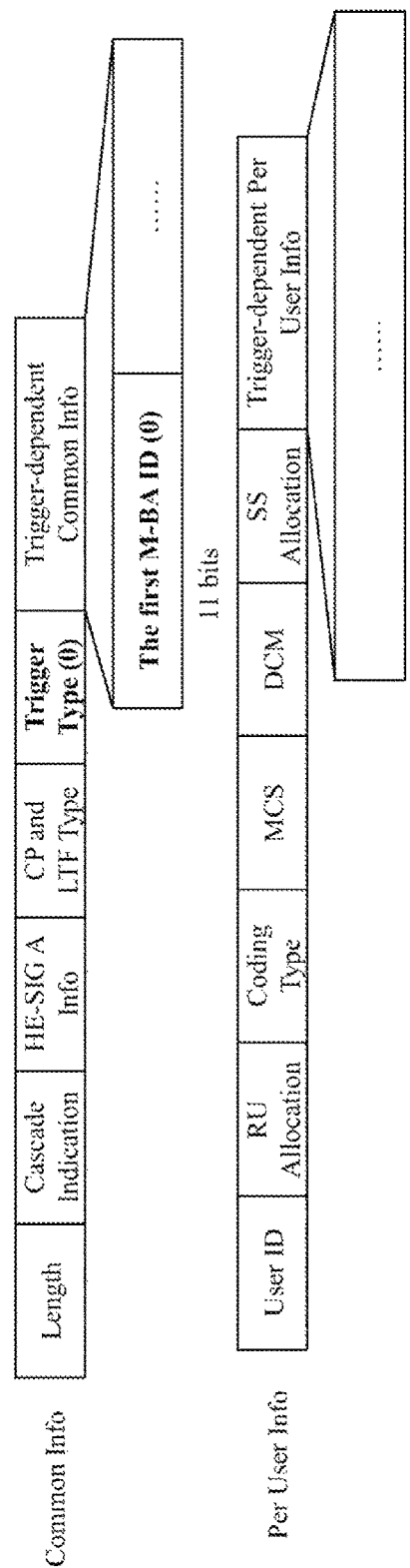

FIG. 27b illustrates a common information field and a Per User field of the trigger frame according to option 2. Referring to FIG. 27b, the trigger type subfield included in the common information field of the trigger frame may be set to a specific value, for example, 0=basic trigger. When the trigger type subfield is set to 0, a reference M-BA ID (e.g., the first M-BA ID) may be set in a common user information field (e.g., trigger-dependent common information subfield) of the trigger, and the M-BA ID index of the corresponding STA may be set in the Per User Info field (e.g., trigger-dependent Per User Info subfield) of the trigger frame. Although an 11-bit reference M-BA ID is set in the trigger-dependent common user information subfield in FIG. 27b, the present invention is not limited thereto. When an AP intends to allocate M-BA ID A to STA 1 as shown in FIG. 26, a reference M-BA ID (e.g., M-BA ID A) may be set in the common user information field which is common for STAs, and the trigger-dependent Per User Info subfield of the Per User Info field (e.g., Per User Info field in which the ID of STA 1 has been set in the User ID subfield) may include M-BA ID index=0 (e.g., which indicates M-BA ID A). When the AP intends to allocate M-BA ID B to STA 5, a reference M-BA ID (e.g., M-BA ID A) may be set in the common user information field which is common for STAs, and the trigger-dependent Per User Info subfield of the Per User Info field (e.g., Per User Info field in which the ID of STA 5 has been set in the User ID subfield) may include M-BA ID index=1 (e.g., which indicates M-BA ID B).

(3) Embodiment 7-3. Optional M-BA ID Allocation Through Trigger Frame (3-1) Method of Using Reference M-BA ID In the method of option 2, an AP may signal whether a trigger frame includes an M-BA ID index subfield for a corresponding STA. An STA which has received a trigger frame which does not include the M-BA ID index subfield can recognize that an M-BA ID has not been allocated. In this manner, the AP does not necessarily allocate an M-BA ID during trigger frame transmission and may not allocate an M-BA ID. Even for an STA to which an M-BA ID is not allocated, the AP may allocate resources for UL MU PPDU transmission to the STA through the trigger frame.

Whether the M-BA ID index subfield is presented (e.g., whether an M-BA ID is allocated) may be signaled through the common information field of the trigger frame. For example, when a reference M-BA ID included in the common information field (e.g., trigger-dependent common information subfield) is set to a preset value (e.g., value O for broadcast), this can indicate that the Per User Info field (e.g., trigger-dependent Per User Info subfield) of the trigger frame does not include the M-BA ID index subfield.

(3-2) Method of Using M-BA ID Presence Field

As described above, an AP may embed an M-BA ID in the trigger frame when the trigger type is 0 (optional).

According to an embodiment of the present invention, the AP may embed an M-BA ID presence field in the trigger frame. The M-BA ID presence field can indicate whether the corresponding trigger frame includes an M-BA ID (e.g., M-BA ID allocation). The M-BA ID presence field may be included in the trigger-dependent common information field or the trigger-dependent Per User Info field. When the M-BA ID presence field is included in the trigger-dependent Per User Info field, M-BA ID allocation/non-allocation is performed per STA.

With respect to an M-BA ID presence field value, at least one of the M-BA ID, reference M-BA ID and M-BA ID index in the aforementioned option 1 or 2 may be included or may not be included in the trigger-dependent common information field or the trigger-dependent Per User Info field.

Figure 27D:
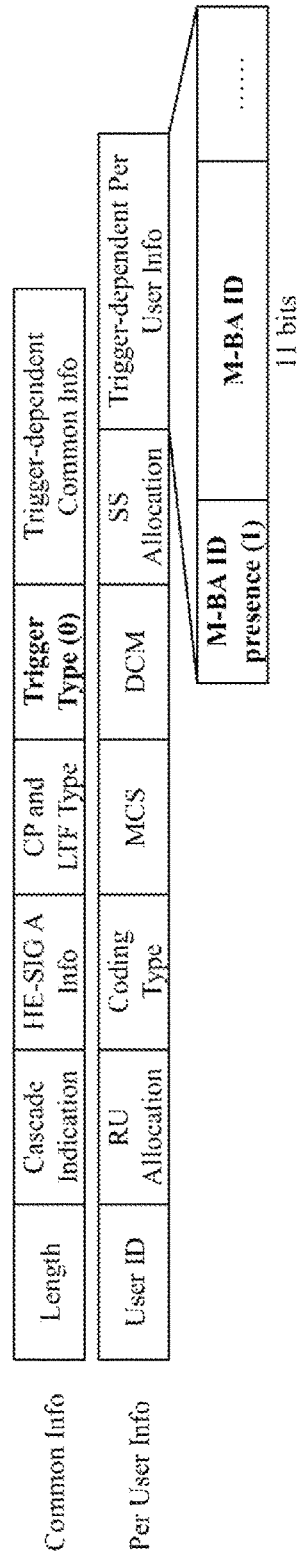
Figure 27E:
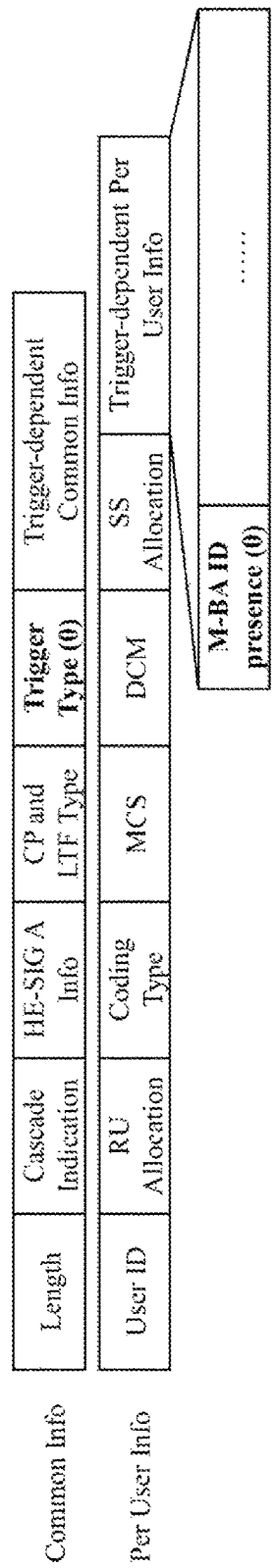

FIG. 27d and FIG. 27e illustrate a case in which an M-BA ID is provided and a case in which an M-BA ID is not provided in an embodiment with respect to option 1. It is assumed that the M-BA ID presence field is included in the trigger-dependent Per User Info field. As shown in FIG. 27d, the trigger-dependent Per User Info field includes the M-BA ID when the M-BA ID presence field is 1. The trigger-dependent Per User Info field includes the M-BA ID when the M-BA ID presence field is 0, as shown in FIG. 27d. The meaning of the bit value of the M-BA ID presence field may be reversed. According to the embodiment illustrated in FIGS. 27d and 27e, the M-BA ID presence field is included in the STA-specific trigger-dependent Per User Info field, and thus presence or absence of the M-BA ID may be set per STA. For example, Per User Info fields for some STAs from among a plurality of Per User Info fields included in the trigger frame include M-BA ID values, but Per User Info fields for some other STAs may not include M-BA ID values.

Figure 27F:
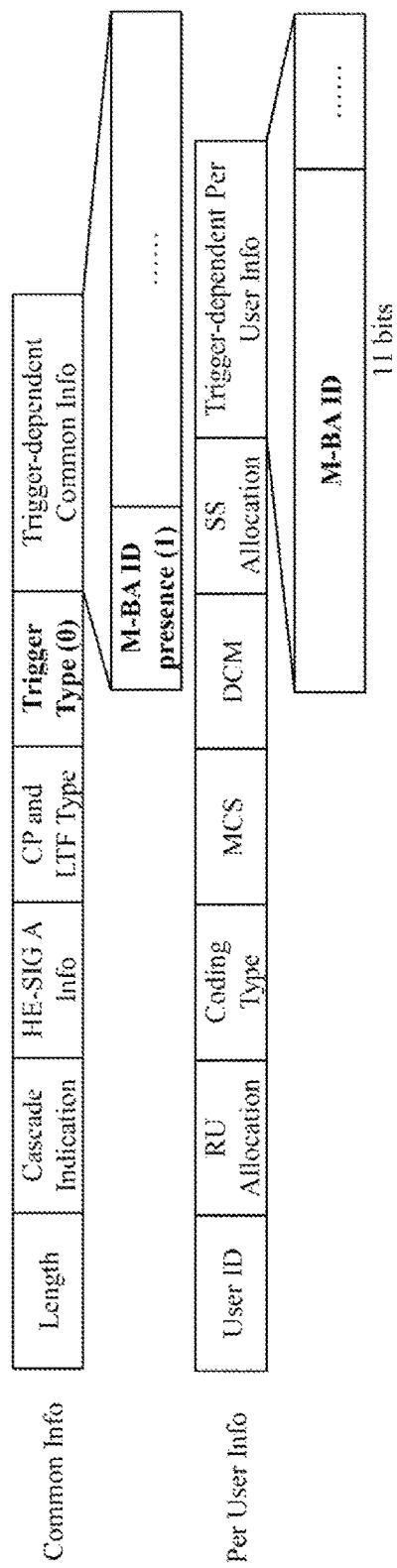
Figure 27G:
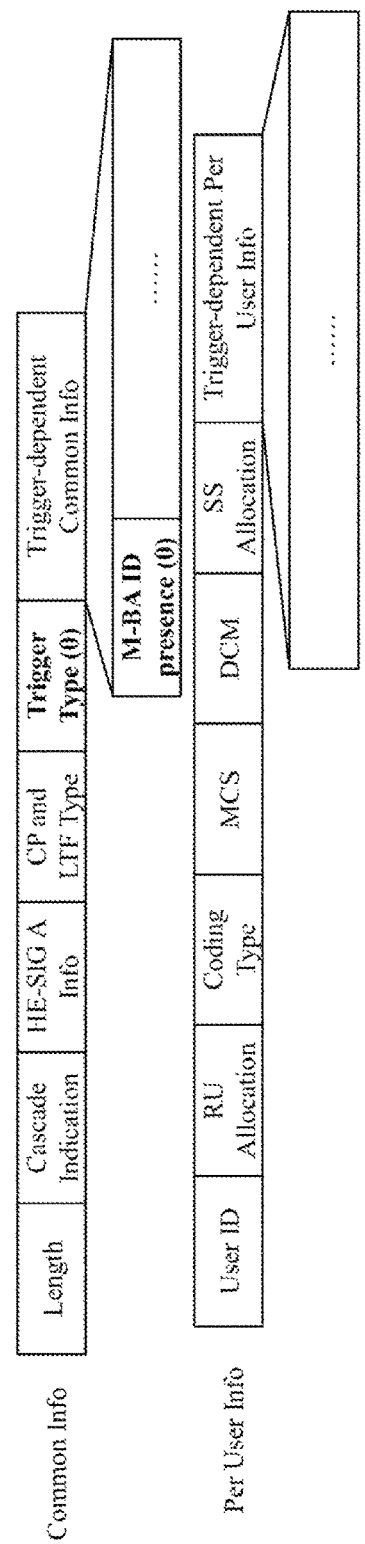

FIGS. 27f and 27g illustrate a case in which an M-BA ID is provided and a case in which an M-BA ID is not provided in another embodiment with respect to option 1. It is assumed that the M-BA ID presence field is included in the common information field (e.g., trigger-dependent common information field). As shown in FIG. 27f, the trigger-dependent Per User Info field includes the M-BA ID when the M-BA ID presence field is 1. The trigger-dependent Per User Info field includes the M-BA ID when the M-BA ID presence field is 0, as shown in FIG. 27f. The meaning of the bit value of the M-BA ID presence field may be reversed. According to the embodiment illustrated in FIGS. 27f and 27g, the M-BA ID presence field is included in the trigger-dependent common information field which is common for STAs, and thus presence or absence of the M-BA ID is also commonly set for STAs. For example, none of the Per User Info fields included in the trigger frame include M-BA ID values when the M-BA ID presence field is 0 and all of the Per User Info fields included in the trigger frame include M-BA ID values when the M-BA ID presence field is 1.

Figure 27H:
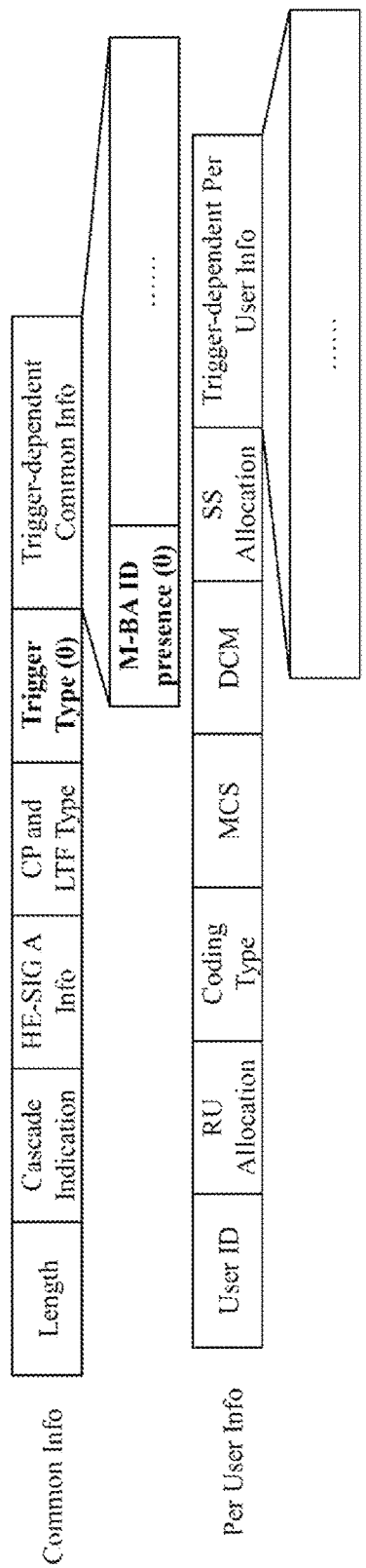
Figure 27I:
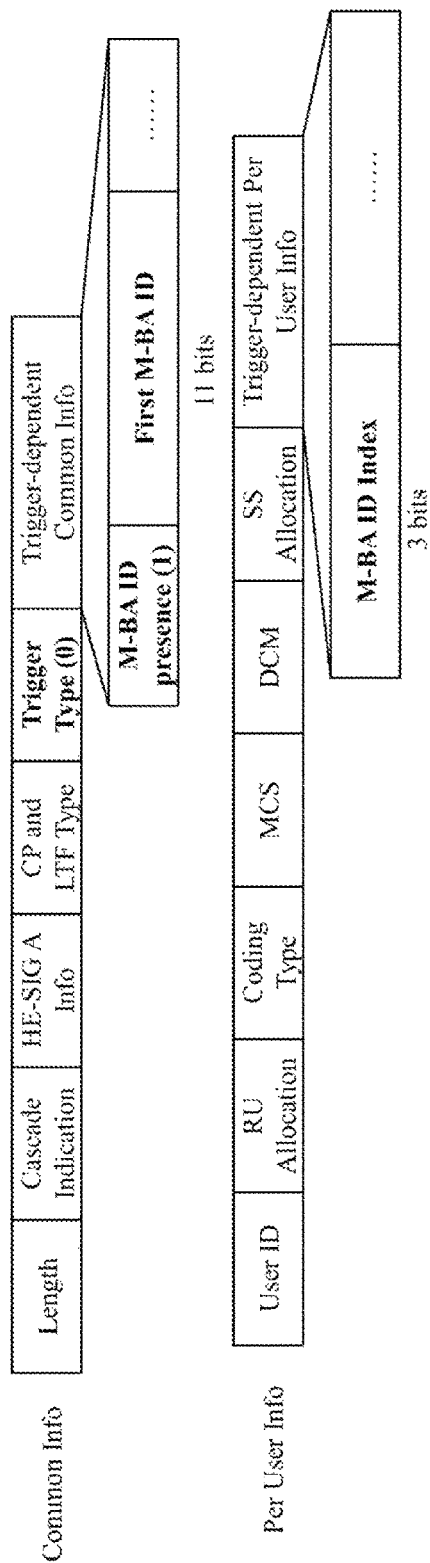

FIGS. 27h and 27i illustrate a case in which an M-BA ID is provided and a case in which an M-BA ID is not provided in an embodiment with respect to option 2. It is assumed that the M-BA ID presence field is included in the common information field (e.g., trigger-dependent common information field). When the M-BA ID presence field is 0 as shown in FIG. 27h, the trigger-dependent common information field does not include a reference M-BA ID (e.g., the first M-BA ID) and the trigger-dependent Per User Info field does not include an M-BA ID index. When the M-BA ID presence field is 1 as shown in FIG. 27i, the trigger-dependent common information field includes a reference M-BA ID (e.g., the first M-BA ID) and the trigger-dependent Per User Info field includes an M-BA ID index. According to the embodiment illustrated in FIGS. 27h and 27i, the M-BA ID presence field is included in the trigger-dependent common information field which is common for STAs, and thus presence or absence of an M-BA ID is also commonly set for STAs. For example, when the M-BA ID presence field is 0, the trigger-dependent common user field does not include a reference M-BA ID value and none of the Per User Info fields included in the trigger frame include M-BA ID index values. When the M-BA ID presence field is 1, the trigger-dependent common user field includes a reference M-BA ID value and all of the Per User Info fields included in the trigger frame include M-BA ID index values.

(3-3) Method of Defining New Trigger Type

According to an embodiment of the present invention, values of the trigger type field included in the trigger frame may be newly defined for M-BA ID allocation. For example, a newly defined trigger type may indicate that the trigger frame includes an M-BA ID (e.g., option 1) or an M-BA ID index (e.g., option 2). Accordingly, the aforementioned M-BA ID presence field may be omitted.

The new trigger type may be selected from reserved values. For example, the new trigger type may be one of 4 to 15. The new trigger type (e.g., integer M, where 3<M<16) has a value different from normal basic trigger type (basic trigger type)=0. The new trigger type may be regarded as a basic trigger type having M-BA ID information added thereto. A trigger frame in which basic trigger type=0 has been set does not include an M-BA ID and a trigger frame in which new trigger type=M has been set includes an M-BA ID.

Figure 27J:
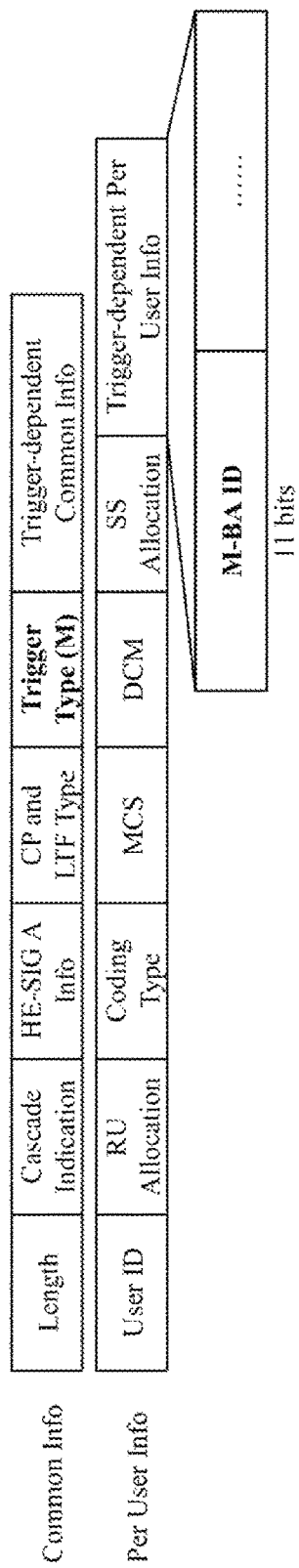

FIG. 27*j* illustrates a case in which a new trigger type is set in an embodiment with respect to the above-described option 1. When the new trigger type is set in the common information field of a trigger frame, a plurality of Per User Info fields (e.g., trigger-dependent Per User Info fields) included in the trigger frame includes M-BA IDs to be allocated to STAs.

Figure 27K:
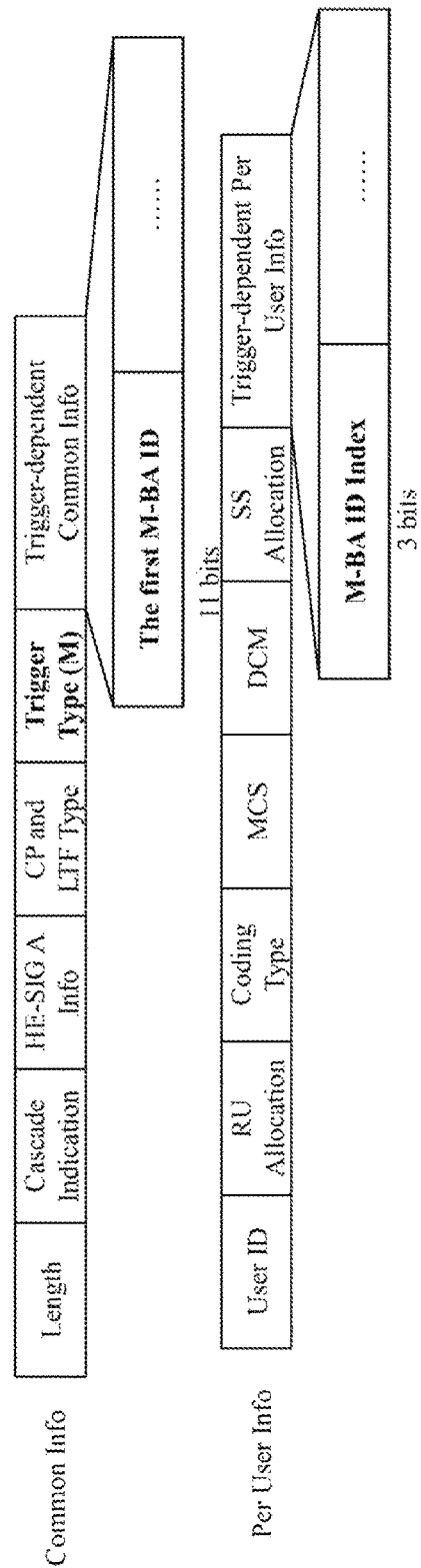
Figure 27I:
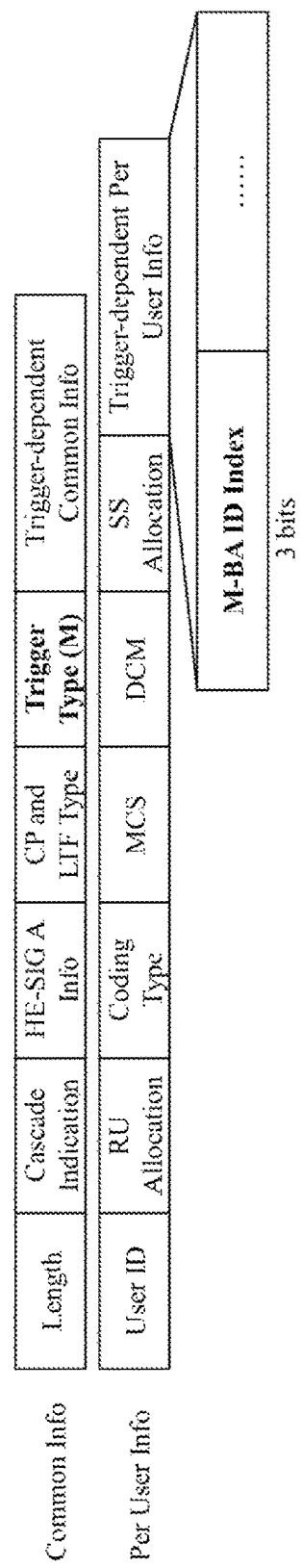

FIG. 27*k* illustrates a case in which a new trigger type is set in an embodiment with respect to the above-described option 2. When the new trigger type is set in the common information field of a trigger frame, the trigger-dependent common information field includes a reference M-BA ID (e.g., the first M-BA ID) and a plurality of Per User Info fields (e.g., trigger-dependent Per User Info fields) included in the trigger frame includes M-BA ID indices which indicate M-BA IDs to be allocated to STAs.

(4) Embodiment 7-4. Range of M-BA ID

According to an embodiment of the present invention, a range of values which can be used as M-BA IDs may be reserved. The range of values which can be used as M-BA IDs may be set to differ from a range of values which can be used as AIDs. For example, among values 0 to 2047 which can be indicated using 11 bits, values in a first range may be used for normal AIDs (e.g., Per STA IDs) and values in a second range which does not overlap with the first range may be used for M-BA IDs. Although it is assumed that values which can be used for M-BA IDs are 2008 to 2015, the present invention is not limited thereto. Since a total of eight values can be used as M-BA IDs, the M-BA ID index length can be set to 3 bits.

When the M-BA ID range is reserved in this manner, signaling of the reference M-BA ID in option 2 may be omitted because the reference M-BA ID can also be reserved (e.g., reference M-Ba ID=2008). Accordingly, trigger frame overhead can be reduced. FIG. 27*l* illustrates a trigger frame in which the reference M-BA ID has been omitted on the basis of option 2.

Figure 27M:
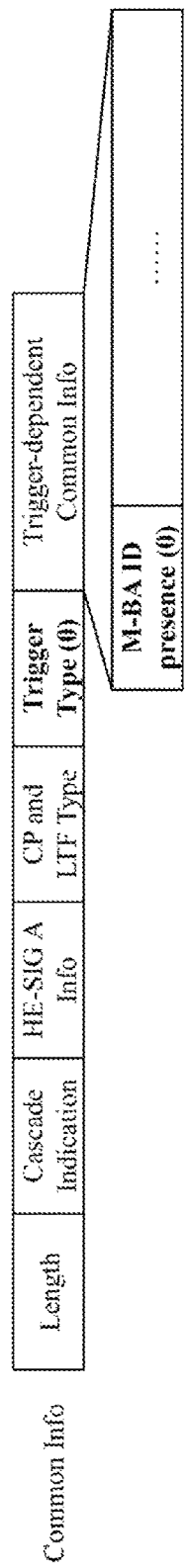

FIG. 27*m* illustrates a case in which the M-BA ID range is reserved and the M-BA ID presence field is set to 0 in an embodiment based on option 1 or option 2. Since M-BA ID presence field=0, the trigger frame does not include an M-BA ID (e.g., option 1) or an M-BA ID index (e.g., option 2).

Figure 27N:
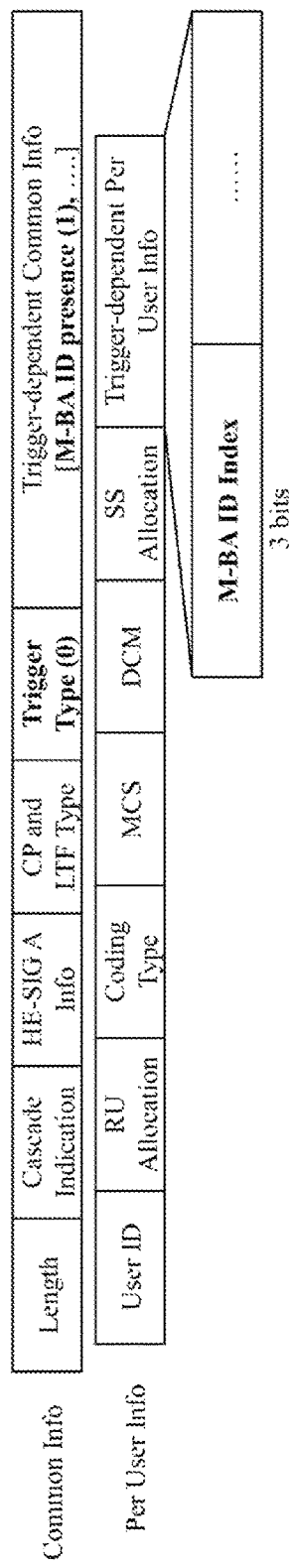

FIG. 27*n* illustrates a case in which the M-BA ID range is reserved and the M-BA ID presence field is set to 1 in an embodiment based on option 2. It is assumed that the M-BA ID presence field is included in the common information field (e.g., trigger-dependent common information field). Since M-BA ID presence field=1, each trigger-dependent Per User Info field of the trigger frame includes an M-BA ID index. The reference M-BA ID is omitted.

Figure 27O:
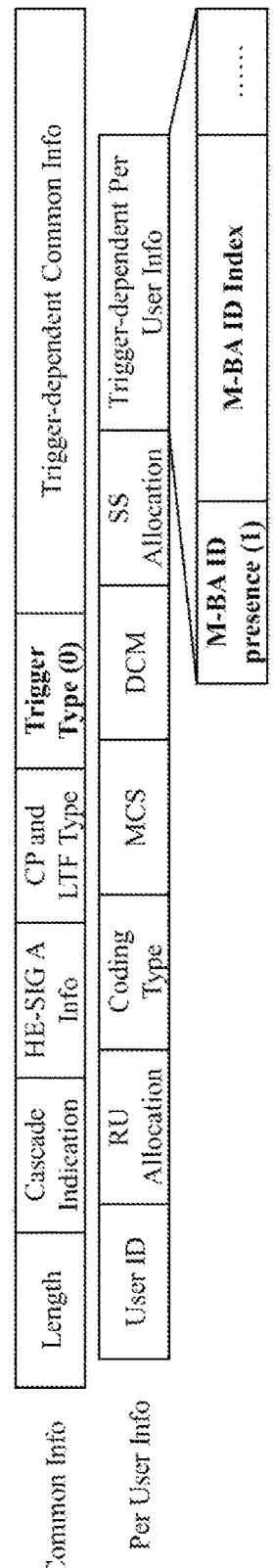

FIG. 27*o* illustrates a case in which the M-BA ID range is reserved and the M-BA ID presence field is set to 1 in an embodiment based on option 2. It is assumed that the M-BA ID presence field is included in the Per User Info field (e.g., trigger-dependent Per User Info field). Each trigger-dependent Per User Info field in which the M-BA ID presence field has been set to 1 includes an M-BA ID index. A trigger-dependent Per User Info field in which the M-BA ID presence field has been set to 0 does not include an M-BA ID index. The reference M-BA ID is omitted.

In summary, unused STA IDs among STA IDs may be allocated to STAs for M-BA (e.g., M-BA ID) temporarily or for a predetermined time, and the trigger frame may be used for M-BA ID allocation. The M-BA frame may be transmitted in the OFDMA PPDU format, and the STA ID subfield of the HE-SIG B field of the M-BA frame may be set to an allocated M-BA ID. According to option 1, an M-BA ID is included in a Per User Info field. According to option 2, a reference M-BA ID may be included in a common user information field and an M-BA ID index which indicates an M-BA ID to be actually allocated may be included in the Per User Info field. Option 2 has lower signaling overhead than option 1.

In addition, values which can be used as M-BA IDs may be reserved, and it is desirable that values which can be used as M-BA IDs be consecutive. The M-BA ID may be valid only in a corresponding TXOP including a trigger frame. For example, the M-BA ID may be invalid or a process for extending validity of the M-BA ID may be performed when TXOP expires.

Embodiment 8. Mapping M-BAID Per Channel

According to an embodiment of the present invention, an M-BA ID (e.g., GID) may be predefined or mapped per channel (e.g., 20 MHz channel or 242 tones). A channel composed of part of all tones is called a subchannel for the sake of convenience of description.

Figure 28A:
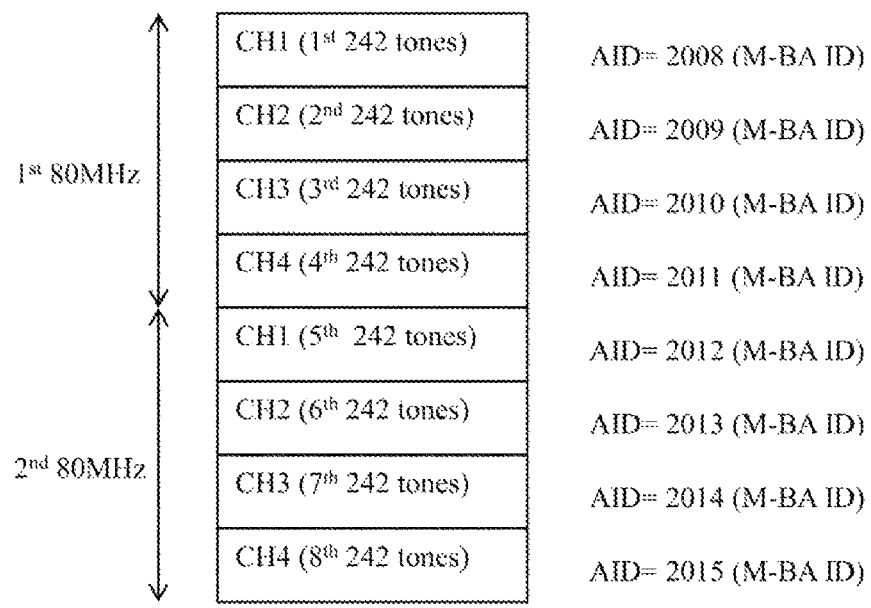
FIGS. 28a and 28b illustrate M-BA IDs for channels according to embodiments of the present invention.

FIG. 28*a* illustrates an M-BA ID per channel according to an embodiment of the present invention. Referring to FIG. 28*a*, eight AIDs of 2008 to 2015 may be used as M-BA IDs. When an STA transmits a UL MU PPDU over a corresponding subchannel, the M-BA ID mapped to the subchannel is automatically allocated to the STA. An STA may specify an M-BA ID to be used thereby depending on the subchannel through which the STA has transmitted a UL MU PPDU.

In FIG. 28*a*, a subchannel size is 242 tones, but the present invention is not limited thereto. For example, a subchannel size may correspond to 106 tones. When one M-BA ID is allocated for 106 tones, 16 values of 2008 to 2023 may be used as M-BA IDs.

An STA may be automatically allocated an M-BA ID by transmitting a UL MU PPDU (or HE trigger based PPDU) through resources included in a corresponding subchannel (e.g., 106/242 tones). For example, M-BA ID=2010 is allocated to an STA which has transmitted a UL MU PPDU through the third 242 tones (CH3).

Embodiments of the present invention are not limited to allocation of an M-BA ID to a subchannel corresponding to 242 tones, and an M-BA ID may be allocated per 484-tone unit or 996-tone unit. For example, in the case of a 160 MHz channel, 14 M-BA IDs of 2008 to 2021 may be allocated to subchannels. In the case of an 80 MHz channel, seven M-BA IDs of 2008 to 2014 may be allocated to subchannels.

Figure 28B:
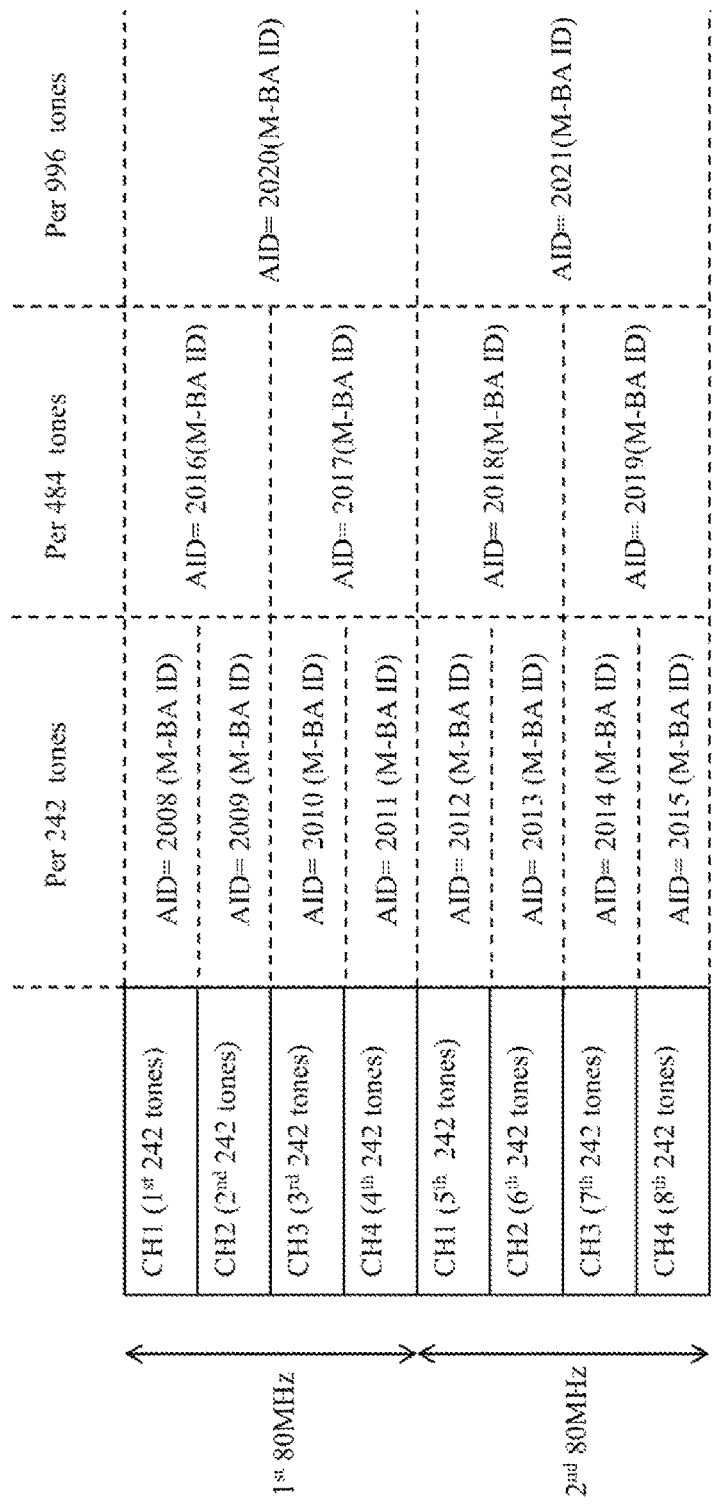

FIG. 28b illustrates an M-BA ID per channel according to an embodiment of the present invention. Referring to FIG. 28b, an STA which has transmitted a UL MU PPDU through the second 242 tones (CH2) may use 2009, 2016 or 2020 as an M-BA ID depending on whether an M-BA ID is allocated per 242-tone unit, 484-tone unit or 996-tone unit. When an AP transmits an M-BA frame through the second 242 tones, the AP may set 2009 as an M-BA ID in the STA ID subfield of the Per User Info field of HE-SIG B of the M-BA frame. When the AP transmits the M-BA frame through the first 484 tones, the AP may set 2016 as an M-BA ID in the STA ID subfield of the Per User Info field of HE-SIG B of the M-BA frame. When the AP transmits the M-BA frame through the first 996 tones, the AP may set 2020 as an M-BA ID in the STA ID subfield of the Per User Info field of HE-SIG B of the M-BA frame.

M-BA ID information per subchannel (e.g., information on mapping between a subchannel and an M-BA ID) may be preset or predefined in the system. The M-BA ID information per subchannel may be signaled to STAs through a management frame, for example, a beacon, a probe response, an association response, a wrapper frame or the like, but the present invention is not limited thereto.

In transmission of a UL MU PPDU, an STA may derive an M-BA ID of a corresponding subchannel on the basis of information on mapping between subchannels and M-BA IDs, which is acquired through the management frame, and the subchannel through which the UL MU PPDU is transmitted. The STA may receive an OFDMA frame (e.g., OFDMA PPDU M-BA frame) using the derived M-BA ID.

Embodiment 9. OFDMA M-BA Frame Transmission Using Per STA ID

According to an embodiment of the present invention, an OFDMA PPDU based M-BA frame (referred to as an OFDMA M-BA frame) may be transmitted using Per STA ID. For example, it may be possible to transmit the M-BA frame using Per STA ID instead of allocating and using an M-BA ID separately from an AID. For example, an M-BA ID may be set to an AID corresponding to Per STA ID.

Figure 29:
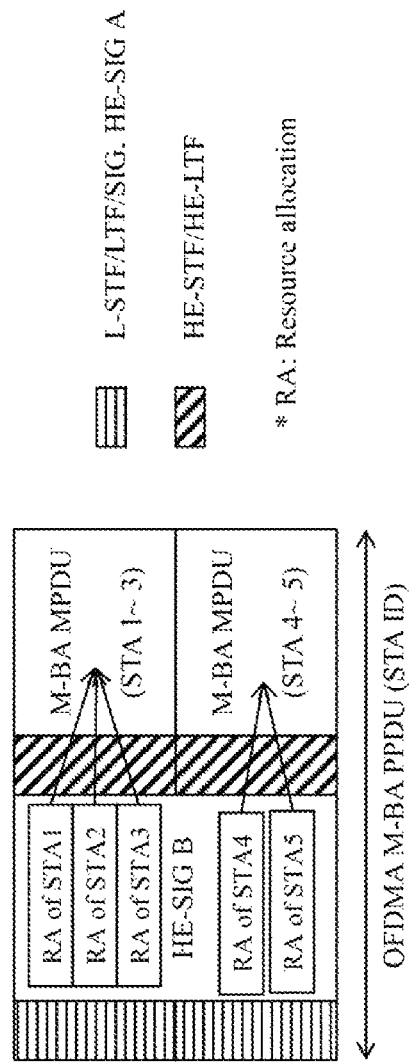
FIG. 29 illustrates an M-BA frame according to another embodiment of the present invention.

FIG. 29 illustrates an OFDMA M-BA frame according to an embodiment of the present invention. Referring to FIG. 29, resource allocation information (e.g., RU allocation information of Per User Info of HE-SIG B) provided to each STA through the OFDMA M-BA frame may indicate M-BA MPDU resources. For example, resource allocation information fields of at least two STAs, which are signaled through the M-BA frame, may indicate the same OFDMA resource (the same OFDMA resource for the corresponding M-BA MPDU). HE-SIG B overhead may vary depending on the number of STAs rather than the number of M-BA allocations.

According to the above-described conventional wireless LAN system, allocation of one RU (resource unit) to multiple STAs is supported only in MU-MIMO. In MU-MIMO, multiple STAs are allocated the same RU but data streams transmitted through the RU are not shared by the STAs. That is, although multiple STAs can be multiplexed on an STA common RU in MU-MIMO, each STA can receive only a data stream thereof from among multiple data streams transmitted through the STA common RU.

However, according to embodiments of the present invention, even though one RU is allocated to multiple STAs, the RU may be used to transmit one data stream instead of being used for MU-MIMO transmission (e.g., multiplexing and transmission of STA specific data streams). Accordingly, STAs need to know whether RU allocation by an AP is for MU-MIMO transmission or transmission of one data stream (e.g., broadcast/multicast of a PPDU set in the SU format), and thus a signaling method for discriminating RU allocation for MU-MIMO transmission from RU allocation for transmission of one data stream is required.

(1) Embodiment 9-1. Signaling Method Using Common Field of HE-SIG B

According to an embodiment of the present invention, whether RU allocation corresponds to MU-MIMO allocation or SU allocation may be indicated through content of a common field of HE-SIG B.

(1-1) Signaling Through RU Allocation Field Among Common Fields of HE-SIG B

According to an embodiment, an 8-bit RU allocation index (Refer to description of Table 2a) set in the RU allocation field of HE-SIG B may be used. For example, whether RU allocation corresponds to SU allocation may be indicated using some of reserved values of RU allocation indices. Referring to Table 2a, "000 1 xxxx", "011 xxxxx" and "111 xxxxx" are reserved and thus some of these values can be used.

TABLE 15

| 8 bits indices | #1 | #2 | #3 | #4 | #5 | #6 | #7 | #8 | #9 | Number of entries |
|---|---|---|---|---|---|---|---|---|---|---|
| 01100 zzz | | 106 | | | 26 | 26 | 26 | 26 | 26 | 8 |
| 01101 zzz | | 106 | | | 26 | 26 | 26 | 52 | | 8 |
| 01110 zzz | | 106 | | | 26 | 52 | | 26 | 26 | 8 |
| 01111 zzz | | 106 | | | 26 | 52 | | 52 | | 8 |

In Table 15, zzz may be set to one of 000 to 111. Accordingly, zzz indicates the number of multiplexed STAs in Table 15. For example, when bits of zzz are represented as "z[3] z[2] z[1]", the number of STAs multiplexed to one RU corresponds to "$2^2*z[3]+2^1*z[2]+2^0*z[1]+1$". The number of STAs multiplexed to one RU can be regarded as the number of STAs which share data streams transmitted through the RU. For example, when a data stream is M-BA MPDU and zzz is 011, the M-BA MPDU may include ACK/BA signals for three STAs.

When the RU allocation index value is set to a value defined in Table 2a, the RU allocation index value can indicate that corresponding RU allocation is MU-MIMO allocation. On the other hand, when the RU allocation index value is set to a value defined in Table 14, the RU allocation index value can indicate that corresponding RU allocation is SU allocation.

(1-2) Method of Defining MU-MIMO Indication in Common Field of HE-SIG B

According to an embodiment, an MU-MIMO indication may be included in a common field of HE-SIG B. For example, the MU-MIMO indication may be set as a bitmap and the MU-MIMO indication bitmap may be included per RU allocation.

In the MU-MIMO indication bitmap, each bit is mapped to an RU corresponding to yyy (e.g., RU to which yyy STAs are multiplexed) and may indicate whether the RU corresponding to yyy is related to MU-MIMO allocation or SU-MIMO allocation.

The MU-MIMO indication bitmap may be set to 2 bits because up to two RUs (e.g., RUs to which STAs can be multiplexed) having a size equal to or greater than 106 tones in RU arrangement are supported as shown in Table 2a (e.g., the number of RUs having a size of 106 tones is 2 in the case of 10 yyy yyy). RU arrangement having at least three RUs having a size equal to or greater than 106 tones may be newly defined. In this case, the size of the MU-MIMO indication bitmap may also increase.

When an RU corresponding to yyy is not present in RU allocation indices, the MU-MIMO indication bitmap may not be used. For example, when the RU allocation indication is 00001111 or less, the MU-MIMO indication bitmap may be omitted.

When RU arrangement indicated by the RU allocation indication includes only one RU corresponding to yyy (e.g., 00100 yyy), only one bit of the MU-MIMO indication bitmap may be used or 1-bit MU-MIMO indication instead of the bitmap may be set. For example, only the first bit of the MU-MIMO indication bitmap is used to indicate whether an RU corresponding to yyy (e.g., 106, 242, 484, 996 or (2*996) tone RU) is used for MU-MIMO and the second bit is not used.

When RU arrangement includes two 106-tone RUs corresponding to yyy, the first bit of the MU-MIMO indication bitmap may be used to indicate whether the first 106-tone RU is used for MU-MIMO and the second bit may be used to indicate whether the second 106-tone RU is used for MU-MIMO.

When the common field of HE-SIG B includes N RU allocations, N MU-MIMO indication bitmaps (e.g., each bitmap is 2 bits) may be included in HE-SIG B.

(2) Embodiment 9-2. Method of Defining MU-MIMO Indication in User Field of HE-SIG B According to an embodiment of the present invention, an indication (e.g., 1-bit type field) which indicates whether each user field included in a user specific field of HE-SIG B is for SU allocation or MU-MIMO allocation may be included in the corresponding user field.

Table 16 shows user fields of a user specific field of HE-SIG B for SU allocation.

TABLE 16

| Subfield | Number of bits | Description 0: SU allocation 1: MU-MIMO allocation |
|---|---|---|
| Type | 1 | |
| STAID | 11 | STAID for broadcast is 0 for a single BSS AP; For multiple BSS APs, an STAID for broadcast to a specific BSS conforms to group addressed AID assignment of TIM according to Multi-BSSID TIM operation; and For multiple BSS APs, a special STAID is reserved for STAID for broadcast to all BSSs. |

TABLE 16-continued

| Subfield | Number of bits | Description 0: SU allocation 1: MU-MIMO allocation |
|---|---|---|
| Type | 1 | |
| NSTS | 3 | The number of streams. |
| Tx Beamforming | 1 | Indication of use of Tx beamforming |
| MCS | 4 | Modulation and coding scheme |
| DCM | 1 | Indication of use of DCM |
| Coding | 1 | Indication of use of LDPC |

Table 17 shows user fields of the user specific field of HE-SIG B for MU-MIMO allocation.

TABLE 17

| Subfield | Number of bits | Description 0: SU allocation 1: MU-MIMO allocation |
|---|---|---|
| Type | 1 | |
| STA-ID | 11 | |
| Spatial Configuration | 4 | Indicates the number of spatial streams for an STA in MU-MIMO allocation |
| MCS | 4 | Indication of use of Tx beamforming |
| DCM | 1 | Modulation and coding scheme |
| Coding | 1 | Indication of use of DCM |

An STA may recognize whether a user field is related to SU allocation or MU-MIMO allocation through a type subfield included in the user field.

Figure 30:
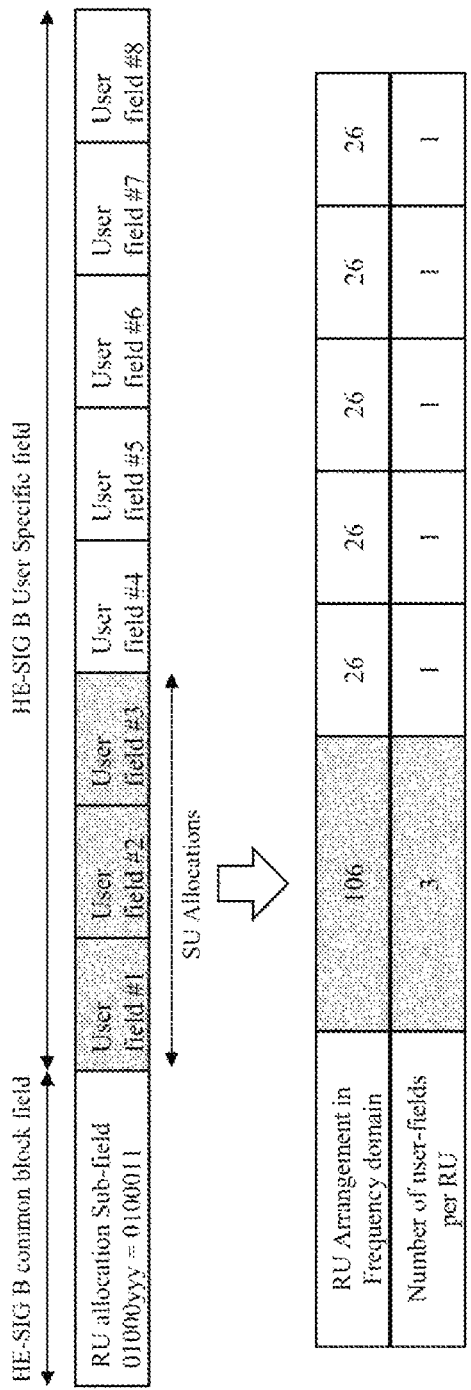
FIG. 30 illustrates STA multiplexing according to an embodiment of the present invention.

FIG. 30 illustrates an example in which three STAs (e.g., three users) are allocated to SU MIMO in one RU (e.g., 106-tone RU) according to an embodiment of the present invention.

(3) Embodiment 9-3. Signaling Through Spatial Configuration Subfield of User Field of HE-SIG B According to an embodiment of the present invention, SU allocation (e.g., OFDMA M-BA allocation) may be indicated using a spatial configuration subfield of a user field of the user-specific field of HE-SIG B.

For example, SU allocation or MU-MIMO allocation may be indicated using values (referred to as unused values hereinafter) which are not used in Table 2b. The same number of streams may be indicated to STAs corresponding to the number of users (Nuser). For example, multiple STAs may share the same streams.

Referring to Table 2b, unused values are (i) Nuser=2: 1010~1111, (ii) Nuser=3: 1101~1111, (iii) Nuser=4: 1011~1111, (iv) Nuser=5: 0111~1111, (v) Nuser=6: 0100~1111, (vi) Nuser=7: 0010~1111 and (vii) Nuser=8: 0001~1111.

Tables 18 to 20 show configurations of the spatial configuration subfield for indicating whether SU allocation is performed using unused values. In Tables 18 to 20, shaded (or underlined) parts correspond to unused values in Table 2b.

TABLE 18

| Nuser | B0 ... B3 | Nsts[1] | Nsts[2] | Nsts[3] | Nsts[4] | Nsts[5] | Nsts[6] | Nsts[7] | Nsts[8] | Total Nsts | Number of Entries |
|---|---|---|---|---|---|---|---|---|---|---|---|
| 2 | 0000~0011 | 1~4 | 1 | | | | | | | 2~5 | 10 |
| | 0100~0110 | 2~4 | 2 | | | | | | | 4~6 | |
| | 0111~1000 | 3~4 | 3 | | | | | | | 6~7 | |
| | 1001 | 4 | 4 | | | | | | | 8 | |
| | 1111 | 1 | 1 | | | | | | | 1 | |
| | 1110 | 2 | 2 | | | | | | | 2 | |
| | 1101 | 3 | 3 | | | | | | | 3 | |

TABLE 18-continued

| Nuser | B0 ... B3 | Nsts[1] | Nsts[2] | Nsts[3] | Nsts[4] | Nsts[5] | Nsts[6] | Nsts[7] | Nsts[8] | Total Nsts | Number of Entries |
|---|---|---|---|---|---|---|---|---|---|---|---|
| 3 | 0000~0011 | 1~4 | 1 | 1 | | | | | | 3~6 | 13 |
|  | 0100~0110 | 2~4 | 2 | 1 | | | | | | 5~7 | |
|  | 0111~1000 | 3~4 | 3 | 1 | | | | | | 7~8 | |
|  | 1001~1011 | 2~4 | 2 | 2 | | | | | | 6~8 | |
|  | 1100 | 3 | 3 | 2 | | | | | | 8 | |
|  | 1111 | 1 | 1 | 1 | | | | | | 1 | |
|  | 1110 | 2 | 2 | 2 | | | | | | 2 | |
|  | 1101 | 3 | 3 | 3 | | | | | | 3 | |

One or more of unused values (e.g., 1010 to 1111 in Nuser=2) may indicate that all of a total of Nsts streams corresponding to the unused values are equally allocated to all identified STAs.

For example, when spatial configuration=1111 in Nuser=2, a total number of streams is 1 in the corresponding RU. Accordingly, the same stream is allocated to two STAs. Stream 1 is allocated to STA 1 identified using user field 1 (e.g., the first user field corresponding to Nsts[1]) and stream 1 is also allocated to STA 2 identified using user field 2 (e.g., the second user field) corresponding to Nsts[2]. That is, the same stream 1 is allocated to STA 1 and STA 2. Stream 1 may be an M-BA MPDU including ACK/BA for STA 1 and ACK/BA for STA 2, but the present invention is not limited thereto.

When spatial configuration=1110 in Nuser=2, a total number of streams is 2. The same two streams are allocated to both STA 1 and STA 2. Spatial Configuration=1110 indicates that the same two streams are allocated to the two STAs.

When spatial configuration=1101 in Nuser=2, a total number of streams is 3. The same three streams are allocated to both STA 1 and STA 2. Spatial Configuration=1101 indicates that the same three streams are allocated to the two STAs.

Table 19 shows a case in which the number of users is 4 to 6.

TABLE 19

| Nuser | B0 ... B3 | Nsts[1] | Nsts[2] | Nsts[3] | Nsts[4] | Nsts[5] | Nsts[6] | Nsts[7] | Nsts[8] | Total Nsts | Number of Entries |
|---|---|---|---|---|---|---|---|---|---|---|---|
| 4 | 0000~0011 | 1~4 | 1 | 1 | 1 | | | | | 4~7 | 11 |
|  | 0100~0110 | 2~4 | 2 | 1 | 1 | | | | | 6~8 | |
|  | 0111 | 3 | 3 | 1 | 1 | | | | | 8 | |
|  | 1000~1001 | 2~3 | 2 | 2 | 1 | | | | | 7~8 | |
|  | 1010 | 2 | 2 | 2 | 2 | | | | | 8 | |
|  | 1111 | 1 | 1 | 1 | 1 | | | | | 1 | |
|  | 1110 | 2 | 2 | 2 | 2 | | | | | 2 | |
|  | 1101 | 3 | 3 | 3 | 3 | | | | | 3 | |
| 5 | 0000~0011 | 1~4 | 1 | 1 | 1 | 1 | | | | 5~8 | 6 |
|  | 0100~0101 | 2~3 | 2 | 1 | 1 | 1 | | | | 7~8 | |
|  | 1111 | 1 | 1 | 1 | 1 | 1 | | | | 1 | |
|  | 1110 | 2 | 2 | 2 | 2 | 2 | | | | 2 | |
|  | 1101 | 3 | 3 | 3 | 3 | 3 | | | | 3 | |
| 6 | 0000~0010 | 1~3 | 1 | 1 | 1 | 1 | 1 | | | 6~8 | 4 |
|  | 0011 | 2 | 2 | 1 | 1 | 1 | 1 | | | 8 | |
|  | 1111 | 1 | 1 | 1 | 1 | 1 | 1 | | | 1 | |
|  | 1110 | 2 | 2 | 2 | 2 | 2 | 2 | | | 2 | |
|  | 1101 | 3 | 3 | 3 | 3 | 3 | 3 | | | 3 | |

Table 20 shows a case in which the number of users is 7 or 8.

TABLE 20

| Nuser | B0 ... B3 | Nsts[1] | Nsts[2] | Nsts[3] | Nsts[4] | Nsts[5] | Nsts[6] | Nsts[7] | Nsts[8] | Total Nsts | Number of Entries |
|---|---|---|---|---|---|---|---|---|---|---|---|
| 7 | 0000~0001 | 1~2 | 1 | 1 | 1 | 1 | 1 | 1 | | 7~8 | 2 |
|  | 1111 | 1 | 1 | 1 | 1 | 1 | 1 | 1 | | 1 | |
|  | 1110 | 2 | 2 | 2 | 2 | 2 | 2 | 2 | | 2 | |
|  | 1101 | 3 | 3 | 3 | 3 | 3 | 3 | 3 | | 3 | |
| 8 | 0000 | 1 | 1 | 1 | 1 | 1 | 1 | 1 | 1 | 8 | 1 |
|  | 1111 | 1 | 1 | 1 | 1 | 1 | 1 | 1 | 1 | 1 | |
|  | 1110 | 2 | 2 | 2 | 2 | 2 | 2 | 2 | 2 | 2 | |
|  | 1101 | 3 | 3 | 3 | 3 | 3 | 3 | 3 | 3 | 3 | |

Tables 18 to 20 are examples and the present invention is not limited thereto. For example, three or more spatial configuration indices for indicating SU allocation may be set. In addition, other index values (e.g., 1010 and 1011 in Nuser=2) may be used for spatial configuration. Further, indicated numbers of streams are not limited to 1, 2 and 3 and may be other values (e.g., 1, 2 and 4 or 1, 3 and 5).

In MU-MIMO, a maximum of eight STAs may be multiplexed per RU. However, the M-BA frame may include BA information about nine or more STAs. Accordingly, nine or more STAs may be multiplexed per RU for M-BA frame transmission.

If the M-BA frame includes BA information about nine or more STAs, a specific spatial configuration index may indicate that a spatial stream of a user field immediately following a corresponding user field is identical to the spatial stream of the corresponding user field.

Table 21 shows spatial configuration subfield encoding for supporting nine or more STAs.

The aforementioned spatial configuration index values are exemplary and thus index values and the number of streams indicated by each index value may be changed according to embodiments. Although it is assumed that the number of streams is 1, 2 or 3, spatial configuration index values may be defined for four or more streams.

According to another embodiment, a spatial configuration index value may be defined to indicate that a specific number of STAs (e.g., nine or more STAs) use the same RU and the same stream. For example, in the case of Nuser=8, spatial configuration index values may be defined such that 0001 indicates that nine STAs share one RU and one stream and 0010 indicates that nine STAs share one RU and two streams.

Figure 32:
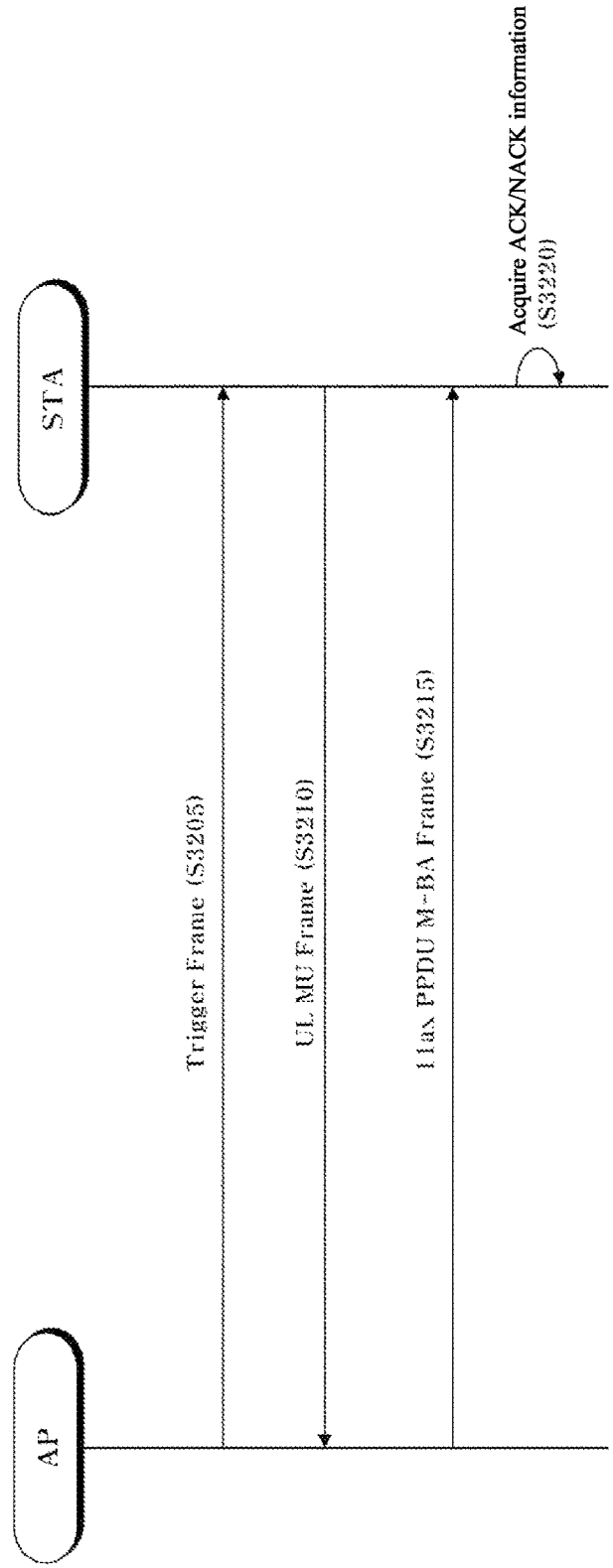
FIG. 32 illustrates a method for transmitting and receiving an M-BA frame according to an embodiment of the present invention.

FIG. 32 illustrates a method of transmitting and receiving an M-BA frame according to an embodiment of the present invention. Redundant description will be omitted.

Referring to FIG. 32, an AP transmits a trigger frame to an STA (S3205). For example, the AP may allocate a GID

TABLE 21

| Nuser | B0...B3 | Nsts[1] | Nsts[2] | Nsts[3] | Nsts[4] | Nsts[5] | Nsts[6] | Nsts[7] | Nsts[8] | Total Nsts | Number of Entries |
|---|---|---|---|---|---|---|---|---|---|---|---|
| 8 | 0000 | 1 | 1 | 1 | 1 | 1 | 1 | 1 | 1 | 8 | 1 |
|   | 0001 | 1 | 1 |   |   |   |   |   |   | 1 |   |
|   | 0010 | 2 | 2 |   |   |   |   |   |   | 2 |   |
|   | 0011 | 3 | 3 |   |   |   |   |   |   | 3 |   |
|   | 1111 | 1 | 1 |   |   |   |   |   |   | 1 |   |
|   | 1110 | 2 | 2 |   |   |   |   |   |   | 2 |   |
|   | 1101 | 3 | 3 |   |   |   |   |   |   | 3 |   |

In Table 21, some values (e.g., 0001, 0010 and 0011) of B0 . . . B3 may be used to support nine or more STAs. Although Nuser=8, nine or more STAs may be actually supported. For example, when the spatial configuration subfield of the eighth user field indicates 0010, two spatial streams for the eighth user field are equally applied to the ninth user field which is not defined through the table. Similarly, when the spatial configuration subfield of the ninth user field indicates 0010, two spatial streams for the ninth user field are equally applied to the tenth user field which is not defined through the table. 0001 indicates one stream, 0010 indicates that a total number of streams is 2, and 0111 indicates that a total number of streams is 3.

FIG. 31 illustrates an HE-SIG B field according to an embodiment of the present invention. In FIG. 31, the HE-SIG B field supports a total of nine STAs.

Referring to FIG. 31, Nuser=8 (111) is indicated in the RU allocation field. Accordingly, Table 20 is used in analysis of the spatial configuration subfield of the user field. It is assumed that a total number of streams is 2.

In user field #1 to user field #8, the spatial configuration subfields are set to 0010 because user fields #1 to #8 and the next user fields (e.g., user fields #2 to #9) use the same RUs and the same streams. In the case of user field #9, the spatial configuration subfield is set to 1110 because user field #10 which uses the same RU and the same stream as those of user field #9 is not present.

Although it is assumed that the number of streams is 2 for the sake of convenience, the present invention is not limited thereto. If one stream is present, the spatial configuration subfields of user fields #1 to #8 indicate 0001 and the spatial configuration subfield of user field #9 indicates 1111. If the number of streams is 3, the spatial configuration subfields of user fields #1 to #8 indicate 0011 and the spatial configuration subfield of user field #9 indicates 1101.

(group ID) to a GID STA through the trigger frame. The GID may be allocated according to a combination of a reference GID and a GID index included in the trigger frame. The GID index may indicate a difference between a reference GID value and a GID value allocated to the STA. In addition, the trigger frame may indicate whether a GID is allocated to the STA through a trigger type subfield or a GID presence subfield.

The STA transmits a UL MU (uplink multi-user) frame on the basis of the trigger frame (S3210).

The STA receives an M-BA frame based on an OFDMA PPDU (physical layer protocol data unit) including a SIG B field (S3215). The STA may acquire a data stream including ACK/NACK therefor from the OFDMA PPDU based M-BA frame (S3220).

For example, the STA may acquire a data stream according to indication of a user field identified by a predetermined ID (e.g., GID or AID) from among a plurality of user fields included in the SIG B field. The data stream indicated by the user field identified by the predetermined ID may be identically allocated to other STAs which perform UL MU transmission on the basis of the trigger frame.

In addition, the STA may be multiplexed with other STAs which have performed UL MU transmission on the basis of the trigger frame on at least one of RUs (resource units) allocated using a user common field of the SIG B field. For example, whether at least one RU on which the STA and other STAs are multiplexed corresponds to MU-MIMO allocation or SU (single user) allocation may be indicated using an RU allocation index set in the user common field.

In the case of SU allocation, the STA shares the data stream with other STAs. For the sake of convenience of description, the operation is called SU allocation because sharing the same data stream by multiple STAs may be regarded as operation similar to SU allocation. In spite of SU allocation, a plurality of STAs may receive the data stream. In the case of MU-MIMO allocation, data streams are not shared by STAs.

Each of a plurality of user fields included in HE-SIG B may include a spatial configuration index which indicates whether the corresponding user field corresponds to MU-MIMO allocation or SU allocation. For example, when the corresponding user field corresponds to SU allocation, the number of data streams of the user field indicated by the spatial configuration index may be set to the total number of data streams for all user fields. In addition, when a spatial configuration index corresponds to a specific value in an N-th user field, a data stream of an (N+1)-th user field may be set to be identical to a data stream of the N-th user field.

Figure 33:
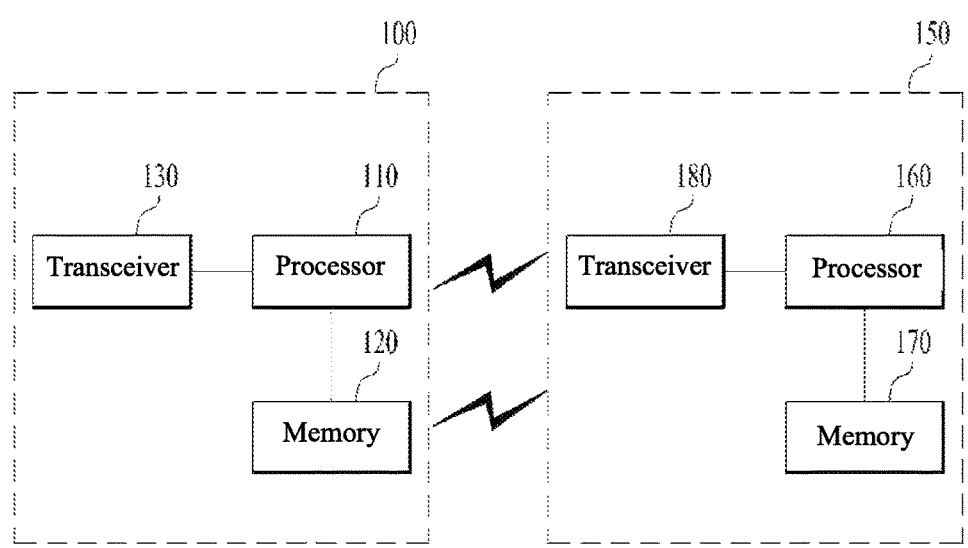
FIG. 33 is a diagram for describing an apparatus according to an embodiment of the present invention.

FIG. 33 is a diagram illustrating apparatuses for implementing the above-described methods.

A wireless apparatus 800 of FIG. 33 may correspond to the above-described STA and a wireless apparatus 850 of FIG. 33 may correspond to the above-described AP.

The STA 800 may include a processor 810, a memory 820, and a transceiver 830, and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described methods may be executed in the form of a module (e.g., a process or a function) performing the above-described functions. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

INDUSTRIAL APPLICABILITY

While the various embodiments of the present disclosure have been described in the context of an IEEE 802.11 WLAN system, the present disclosure is not limited thereto. The present disclosure is also applicable in the same manner to various WLAN systems in which an AP can perform a Block ACK mechanism for a plurality of STAs.

The invention claimed is:

1. A method of receiving a multi-STA BlockAck (M-BA) frame by a station (STA) in a wireless local area network (LAN) system supporting orthogonal frequency divisional multiple access (OFDMA), the method comprising:
transmitting an uplink multi-user (UL MU) frame based on a trigger frame;
receiving an M-BA frame based on an OFDMA physical layer protocol data unit (PPDU) including a SIG B field; and
acquiring a data stream including ACK/NACK for the STA from the OFDMA PPDU based M-BA frame,
wherein the STA acquires the data stream according to an indication of a user field which is identified by a predetermined identifier (ID) from among a plurality of user fields included in the SIG B field, and
wherein the data stream indicated by the user field identified by the predetermined ID is identically allocated to other STAs which have performed UL MU transmission based on the trigger frame.

2. The method according to claim 1, wherein the STA is multiplexed with the said other STAs which have performed UL MU transmission based on the trigger frame on at least one of resource units (RUs) allocated through a user common field of the SIG B field.

3. The method according to claim 2, wherein whether the least one RU on which the STA and the said other STAs are multiplexed corresponds to multi-user multi-input multi-output (MU-MIMO) allocation or single user (SU) allocation is indicated by an RU allocation index configured in the user common field.

4. The method according to claim 1, wherein the predetermined ID is a group ID (GID) allocated through the trigger frame or an association ID (AID) of the STA.

5. The method according to claim 4,
wherein the GID is allocated according to a combination of a reference GID and a GID index included in the trigger frame, and
wherein the GID index indicates a difference between a value of the reference GID and a GID value allocated to the STA.

6. The method according to claim 4, wherein the trigger frame indicates whether the GID is allocated to the STA through a trigger type subfield or a GID presence subfield.

7. The method according to claim 1, wherein each of the plurality of user fields includes a spatial configuration index indicating whether a corresponding user field corresponds to multi-user multi-input multi-output (MU-MIMO) allocation or single user (SU) allocation.

8. The method according to claim 7, wherein, when the corresponding user field corresponds to SU allocation, a number of data streams of the corresponding user field indicated by the spatial configuration index is set to be identical to a total number of data streams for all of the plurality of user fields.

9. The method according to claim 7, wherein, when the spatial configuration index corresponds to a specific value in an N-th user field, a data stream of an (N+1)-th user field is set to be identical to a data stream of the N-th user field.

10. A method of transmitting a multi-STA BlockAck (M-BA) frame by an access point (AP) to a station (STA) in a wireless local area network (LAN) system supporting orthogonal frequency divisional multiple access (OFDMA), the method comprising:
transmitting a trigger frame to a plurality of STAs including a first STA and a second STA;

receiving a plurality of uplink multi-user (UL MU) frames from the plurality of STAs based on the trigger frame; and transmitting an M-BA frame based on an OFDMA PPDU including a SIG B field in response to the UL MU frames, wherein the AP indicates a first user field to be received by the first STA from among a plurality of user fields included in the SIG B field using a predetermined identifier (ID), and wherein a data stream of the first STA allocated through the first user field is identically allocated to the second STA which has performed UL MU transmission based on the trigger frame.

11. A station (STA) receiving a multi-STA BlockAck (M-BA) frame in a wireless local area network (LAN) system supporting orthogonal frequency divisional multiple access (OFDMA), the STA comprising:

a transmitter for transmitting an uplink multi-user (UL MU) frame based on a trigger frame;

a receiver for receiving an M-BA frame based on an OFDMA physical layer protocol data unit (PPDU) including a SIG B field; and a processor for acquiring a data stream including ACK/NACK for the STA from the OFDMA PPDU based M-BA frame, wherein the processor acquires the data stream according to an indication of a user field which is identified by a predetermined identifier (ID) from among a plurality of user fields included in the SIG B field, and wherein the data stream indicated by the user field identified by the predetermined ID is identically allocated to other STAs which have performed UL MU transmission based on the trigger frame.

12. The STA according to claim 11, wherein the STA is multiplexed with the said other STAs which have performed UL MU transmission based on the trigger frame on at least one of resource units (RUs) allocated through a user common field of the SIG B field.

13. The STA according to claim 11, wherein the predetermined ID is a group ID (GID) allocated through the trigger frame or an association ID (AID) of the STA.

14. The STA according to claim 11, wherein each of the plurality of user fields includes a spatial configuration index indicating whether a corresponding user field corresponds to multi-user multi-input multi-output (MU-MIMO) allocation or single user (SU) allocation.

* * * * *